(12) United States Patent
Wright et al.

(10) Patent No.: US 6,366,776 B1
(45) Date of Patent: Apr. 2, 2002

(54) END-TO-END TRANSMISSION TECHNIQUES FOR A PROCESSING SATELLITE SYSTEM

(75) Inventors: David A. Wright, Solana Beach; Reginald Jue, Manhattan Beach; Stuart T. Linsky, San Pedro; Dennis A. Nivens, Hermosa Beach, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/408,225

(22) Filed: Sep. 29, 1999

(51) Int. Cl.[7] ................................................ H04Q 7/20

(52) U.S. Cl. ..................... 455/427; 455/12.1; 455/13.2; 455/13.4; 455/522; 370/347; 370/442

(58) Field of Search ................................ 455/427, 12.1, 455/13.1, 13.2, 13.4, 522, 38.3, 422; 370/336, 337, 347, 442, 445; 342/352, 353, 354, 356, 358

(56) References Cited

U.S. PATENT DOCUMENTS

| | | | | |
|---|---|---|---|---|
| 5,517,690 A | * | 5/1996 | Linquist et al. | ............ 455/13.1 |
| 5,603,091 A | * | 2/1997 | Linquist et al. | ............ 455/13.2 |
| 5,809,397 A | * | 9/1998 | Harthcock et al. | ......... 455/13.2 |
| 6,049,548 A | * | 4/2000 | Bruno et al. | ................ 370/445 |

\* cited by examiner

Primary Examiner—Nay Maung
Assistant Examiner—Quochien B. Vuong
(74) Attorney, Agent, or Firm—McAndrews, Held & Malloy, Ltd.

(57) ABSTRACT

Coordination of processing satellite uplink transmission and downlink transmission is achieved by an uplink encoder (418) and uplink modulator (420) which incorporate an adjustable IF amplifier (417) at a ground terminal (400). Information about data traffic transmission errors detected in a satellite (100) is formed into ATM traffic report cells by a cell former (157). The traffic report cells are sent on the downlink to the ground terminal. The traffic report cells are used to adjust the power level of the IF amplifier for the particular channel and slot for which errors were detected.

40 Claims, 15 Drawing Sheets

END-TO-END TRANSMISSION TECHNIQUES FOR A PROCESSING SATELLITE SYSTEM

BACKGROUND OF THE INVENTION

This invention relates to processing communication satellite systems and more particularly relates to coordination between the uplinks and downlinks of such systems.

A multibeam processing satellite system requires a comprehensive and consistent approach to its transmission system, including both its uplink and its downlink. Since the uplink and downlink transmission systems are decoupled by the processing (by demodulation, decoding, and switching) on the satellite, these two parts may be defined separately. However, in order to obtain optimum performance, the uplink and downlink should be connected or coordinated to moderate the uplink transmission in accordance with downlink transmissions.

The uplink transmission system definition must include all aspects relating to the spatial, polarization, spectral, and temporal attributes and, in particular, methods of multiple access to permit many users to utilize the uplink concurrently. Additionally, various data handling issues, including error control and protocol aspects relating to the way that transmission data are organized, must be defined.

The downlink transmission system definition must include all aspects relating to the spatial, polarization, spectral, and temporal attributes and, in particular, methods of multiplexing to permit many users to be concurrently serviced by the downlink. Additionally, various data handling issues, including error control and protocol aspects relating to the way that transmission data units are organized must be defined.

The coordination between uplink and downlink must be consistent with both the uplink transmission system definition and the downlink transmission system definition.

BRIEF SUMMARY OF THE INVENTION

A first embodiment of the invention is useful in a processing satellite communication system comprising an uplink for transmitting uplink data cells on an uplink beam from a ground terminal to the satellite and a downlink for transmitting downlink data cells on a downlink beam from the satellite to a ground terminal. The first embodiment may be used for controlling the transmission of the uplink data cells. In such an environment, the uplink data cells are grouped with an error correction code, preferably by an encoder. The uplink data cells also are located in predetermined uplink time slots within uplink frames comprising the uplink data cells. The uplink frames are modulated by a predetermined form of modulation to enable placement of the modulated uplink frames into a plurality of uplink channels suitable for transmission to the satellite on the uplink beam. The uplink channels comprise a plurality of the uplink time slots, and the modulating preferably is done by a modulator. The power level at which the uplink beam may be transmitted to the satellite is made adjustable, preferably by using an adjustable amplifier. The channels are demodulated into demodulated uplink frames, preferably by a demodulator located at the satellite. The error correction code is decoded, errors in the correction code are detected and at least an error estimate of errors in said correction code is made, preferably by a decoder located at the satellite. Report cells are formed comprising error information in response to the error estimate, addresses identifying destinations and identifiers indicating that the report cells contain the error information. The report cell forming preferably is done with a cell former located in the satellite. Downlink frames comprising the report cells are generated for transmission on the downlink beam, preferably by a frame organizer located in the satellite. The report cells from the downlink frames are unpacked and the power level is adjusted based on the error information in the report cells, preferably by a processor responsive to the downlink beam located at one of the ground terminals.

A second embodiment of the invention also is useful in a processing satellite communication system comprising an uplink for transmitting uplink data cells on an uplink beam from a ground terminal to the satellite and a downlink for transmitting downlink data cells on a downlink beam from the satellite to a ground terminal. The second embodiment also may be to used for controlling the transmission of the uplink data cells. In such an environment, burst signals are located or placed in predetermined time slots within uplink frames comprising the uplink data cells, preferably by an uplink frame organizer located at the ground terminal.

The uplink frames are launched at a predetermined adjustable time from the ground terminal so as to place the uplink frames into a plurality of uplink channels suitable for transmission to the satellite on the uplink beam. The uplink channels comprise a plurality of the time slots. The launching preferably is done with an uplink unit located at the ground terminal. The power level at which the uplink beam may be transmitted to the satellite is made adjustable, preferably by using an adjustable amplifier located at the ground terminal. The channels are demodulated into demodulated uplink frames, preferably by a demodulator located at the satellite. At least an estimate of the received energy of the burst signals or the time of arrival of the burst signals at the satellite is made, preferably by an uplink processor responsive to the uplink beam and located at the satellite. Report cells comprising report information in response to the estimate of the received energy of the burst signal or the time of arrival of the burst signal at the satellite, addresses identifying destinations and identifiers indicating that the report cells contain the report information are generated, preferably by a cell former located at the satellite. Downlink frames comprising the report cells are generated for transmission on the downlink beam, preferably by downlink frame organizer located at the satellite. The report cells are unpacked from the downlink frames, the power level is adjusted based on the report information in the report cells in response to the estimate of the received energy of the burst signal or the adjustable time is adjusted based on the report information in the report cells in response to the time of arrival of the burst signals at the satellite. The unpacking and adjustments preferably are made by a downlink processor responsive to the downlink beam and located at the ground terminal.

In summary, the preferred embodiments of the invention provide coordination between an uplink and a downlink that is highly efficient, versatile, and accurate.

DETAILED DESCRIPTION OF THE PREFERRED EMBODIMENTS

Figure 1:
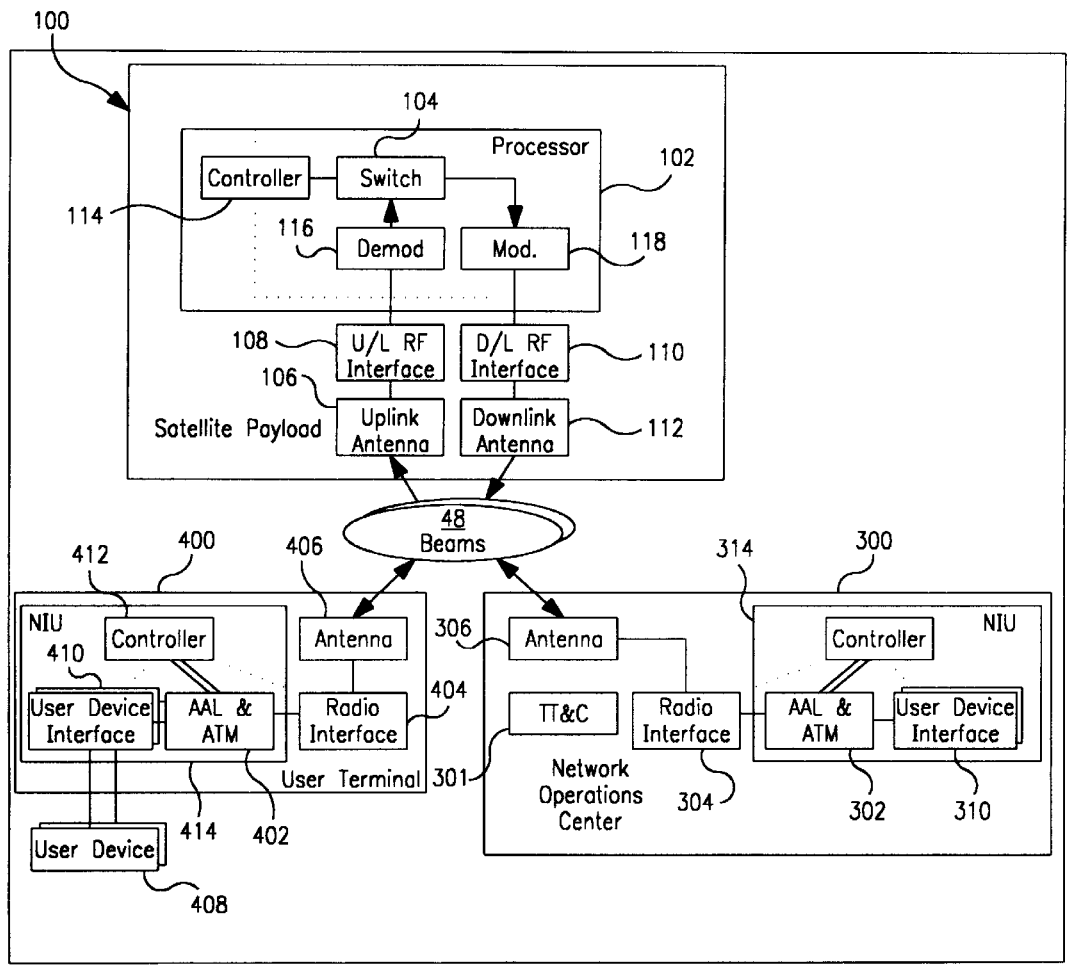
FIG. 1 is a schematic block diagram of a preferred form of transmission and reception apparatus made in accordance with the invention.

Referring to FIG. 1, a preferred form of the invention includes one or more satellites, such as satellite 100, in geostationary orbit. Satellite 100 contains a processor 102 that performs a cell switching function. The processor's controller 114 configures a cell switch 104 based on commands received from one or more ground-based Network Operations Center (NOCs) such as NOC 300. The NOC 300 provides ATM switch management functionality, including control of call admission and maintenance of signaling with one or more User Earth Terminals (UETs), such as UET 400, required to establish an ATM switched virtual circuit.

The payload of satellite 100 is controlled by NOC 300 which may control multiple satellites.

ATM cells transmit user data through the system, from source UET 400 to a destination UET (not shown but functionally identical to source UET 400). This is the primary system flow, starting from the AAL/ATM component 402 within the UET 400; flowing through the UET's RF interface 404 and antenna 406; through the satellite payload's uplink antenna 106 and RF interface 108; switched through the processor 102 through the payload's downlink RF interface 110 and antenna 112; and finally through the destination UET's antenna and RF interface to the destination UET's ATM/AAL component (not shown).

User data is transferred between the system and a user device 408 via the "External User Data" flow. This data flow, which is in a format unique to the user device, yet based on industry standards, is converted into a UET internal format (e.g., a PCI bus) by a user device interface 410 and transferred to the ATM/AAL component 402 where it is reformed into an ATM cell flow. In addition to the transfer of user data, ATM cells are used to transport signaling. This data flow includes the signaling of messages between the controllers located in the NOC 300, payload processor 102 and UET 400. ATM cells are used in this stream for two reasons. First, the satellite payload's controller can exchange messages with any UET and NOC by simply sending an ATM cell with the correct address to the cell switch 104. The controller-switch interface is then just like any other switch port. Second, the multiple access scheme in the UET and NOC must already address the insertion of ATM cells into the transmission subsystem to carry user data. Inserting signaling messages into this data stream is made simpler by using the same ATM cell format.

Control and management signals are provided internal to each component: the terminal controller unit 412 in the UET 400 must signal the RF interface 404 to tune to a particular frequency, for example. The payload controller 114 must collect traffic statistics from the demodulators; telemetry data is collected within the NOC's TT&C 301 and transferred to the satellite 100; the payload controller 114 must configure the switch 104 to route virtual circuits; timing and frequency signals must be passed to many payload components, etc.

UET 400 provides the capability to connect user devices to the network. The term "user device" refers to any communication equipment that conforms to industry standard interfaces, including PCs, telephones, set-top boxes, ATM switches, IP routers, UNIX workstations, etc.

User devices communicate with other user devices, attached to other UETs through the use of ATM switched virtual circuits (VCs). Individual VCs are established and maintained through signaling messages exchanged between NOC 300 and the UET 400. A single UET can support multiple VCs and user devices.

The user device 408 may or may not support the ATM protocols. For non-ATM user devices, the UET 400 encapsulates the user data stream in ATM cells for transmission across the network. The destination UET then recovers the user data stream which is passed to the destination user device.

User device 408 represents a variety of current consumer electronics devices, including personal computers, set-top boxes, interactive game players, and Web-TV devices. These devices interface with the Network Interface Unit (NIU) 414 via industry standard interfaces or "ports" including the RJ-11 telephone jack; PC buses such as EISA, PCI and SCSI; LAN networks such as Ethernet and IEEE 802.3; and video and audio ports.

The external interface components of the NIU 414 provides the mechanical and electrical interface to the user device. Functionally, a unique line interface exists for each type of interface (RJ-11,PCI, 802.3). Physically, a single NIU may include several line interfaces. For example, an NIU may be packaged as a "plug-in" card for a PCI bus and provide RJ-11 and IEEE 802.3 line interfaces.

Component 402 within the NIU 414 is responsible for converting a stream of bits produced by the user device interface into ATM cells. In order to produce ATM cells, this component implements various ATM Adaption Layer (AAL) protocols. It is also responsible for inserting messages produced by the controller into the ATM "stream" and removing ATM cells received from the network destined for the controller.

The controller 412 provides network specific signaling functions. This includes subscriber registration, the establishment of connections between the UET 400 and the network and network management functions.

The radio interface 404 of the UET 400 provides forward error correction (FEC) coding and modulation for data being transmitted to the network and demodulation, de-interleaving and decoding for data received from the network. This includes the framing of ATM cells produced by the protocol adaptation component into multiple frequency TDMA channel slots on the uplink.

The antenna 406 is responsible for radiating energy toward the satellite 100 and collecting energy from the satellite's downlink.

UET 400 can assume many different physical forms. To support a consumer grade terminal, a plug-in PC card may contain the NIU 414 and portions of the radio interface 404, with a cable connecting the card to an outdoor device housing the remainder of the radio interface 404 and the antenna 406.

To support an Internet Service Provider's gateway, UET 400 may consist of one or more 10baseT user device interface cards (each connected to a port on a router), a single board computer to serve as the controller 412, an AAL/ATM card 402 to provide ATM functions, and a separate card to provide the radio interface 404. These cards could all reside in VME chassis and be mounted in the same rack as the router and other ISP equipment.

In each of these examples, the architecture of the UET remains unchanged. Each contains an NIU 414 that interfaces with one or more user devices, a radio interface 404 and an antenna 406. This same architectural philosophy is extended to the network operations center 300. The NOC 300 also contains an NIU 314 where the very same functions present in the NIU 414 are performed. The corresponding devices in NOC 300 bear the same numbers as in UET 400, except that they are in the 300 series, rather than the 400 series.

The central role of the satellite 100 payload is to switch ATM cells from source to destination. In order to switch ATM cells, uplink bursts bearing the cells must be recovered (demodulated and decoded), partitioned into cells, and routed through the switch 104. These functions constitute a "processed payload" in common industry parlance and are provided by the processor 102 in the system architecture.

The processor contains the following components:

A demodulator 116 provides an A/D converter, channelizer and demodulator for each band. The demodulator supports two coding rates: a light code for normal service and a heavy code to compensate for rain loss. Each uplink channel or subchannel is designated as either heavily coded or lightly coded.

The switch 102 performs decoding, ATM cell switching and encoding. The switch is designed to support many incoming and many outgoing ports, each operating at up to the maximum cell rate that can be maintained on the uplink and downlink respectively. Typically, a switch may have 64 incoming and 64 outgoing ports. The 64 ports are divided between 48 to support the uplink and downlink beams, 2 ports connected to each crosslink, 10 ports connected to multicast modules that provide cell duplication and 2 ports connected to the controller.

The controller 114 provides network specific signaling functions. This includes the establishment of virtual circuits through the ATM switch and network management functions.

A modulator 118 performs coding, modulation and signal shaping. Mirroring the demodulator, the modulator supports two coding rates: heavy and light. Each downlink frame may be either heavily coded or lightly coded. Cells received from the switch are designated as either heavy or light and are placed in a downlink frame of the appropriate code type accordingly.

Uplink antenna 106 receives 48 spot beams across at least a portion of 1,000 MHz of spectrum in the 30 GHz band using a 1-in-4 frequency reuse pattern.

Uplink RF interface 108, comprises a bandpass filter to select a frequency band assigned to one of 48 beams. For each band, the uplink RF interface 108 provides a low noise amplifier and a down-converter.

Downlink RF interface 110 comprises an upconverter, traveling wave tube amplifier (TWTA), and waveguide each feeding one 125 MHz band.

Downlink Antenna 112 transmits 48 spot beams across 1,000 MHz of spectrum in the 20 GHz band, using a 1-in-4 frequency reuse pattern.

The Network Operations Center (NOC) 300 serves as the "switch manager" for the satellite payload's cell switch. The NOC 300 controls the establishment of each ATM virtual circuit through an exchange of signaling messages with the source and destination UETs.

In its switch manager role, the NOC 300 performs a variety of functions, including: call establishment signaling; cell switch configuration; call admission control; user authentication; user service authorization; address resolution; routing; connection statistics collection; network congestion control; and priority access control.

The components within the NOC appearing in FIG. 1 are summarized below:

Antenna 306 is functionally the same as UET's antenna 406 with the additional capability to transmit and receive TT&C signals. The Ka-band may be used for TT&C, or another band, requiring a different antenna, could be used. Typically, a NOC has a larger antenna 306 than the equivalent for a UET 400.

RF interface 304 is functionally the same as the UET's RF interface 404 with greater performance.

Network Interface Unit 314 is functionally the same as the UET's NIU 414, with greater performance.

Figure 2:
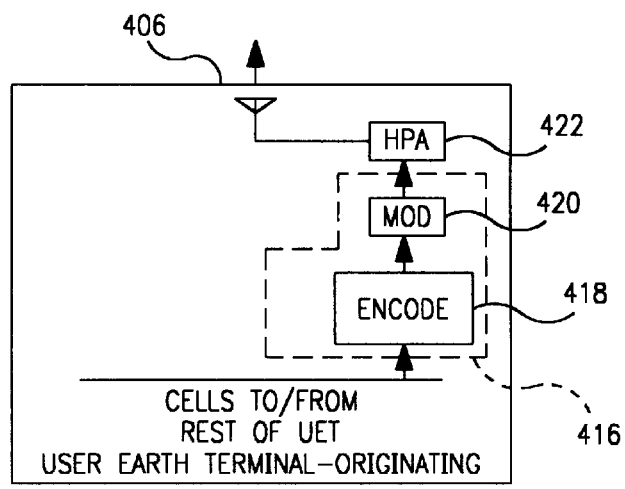
FIG. 2 is a schematic block diagram of a preferred form of uplink transmission subsystem made in accordance with the present invention.

As shown in FIG. 2, RF interface 404 comprises an uplink baseband unit 416 including an encode circuit 418, a modulator 420 and a high power amplifier (HPA) 422. Unit 416 includes a frame former unit described in more detail later.

Figure 3:
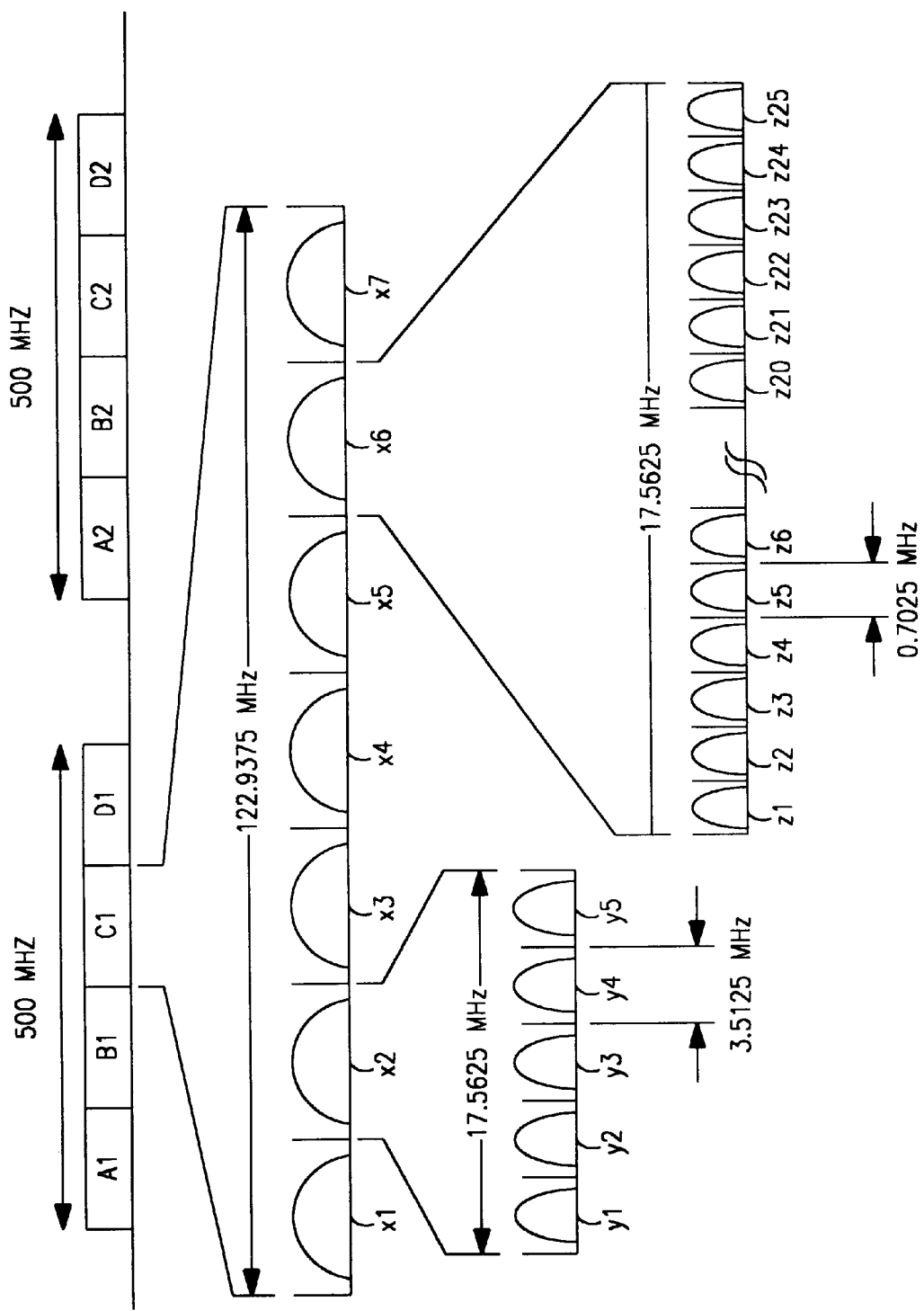
FIG. 3 illustrates a preferred form of frequency layout of uplink channelization made in accordance with the preferred embodiment.
Figure 4:
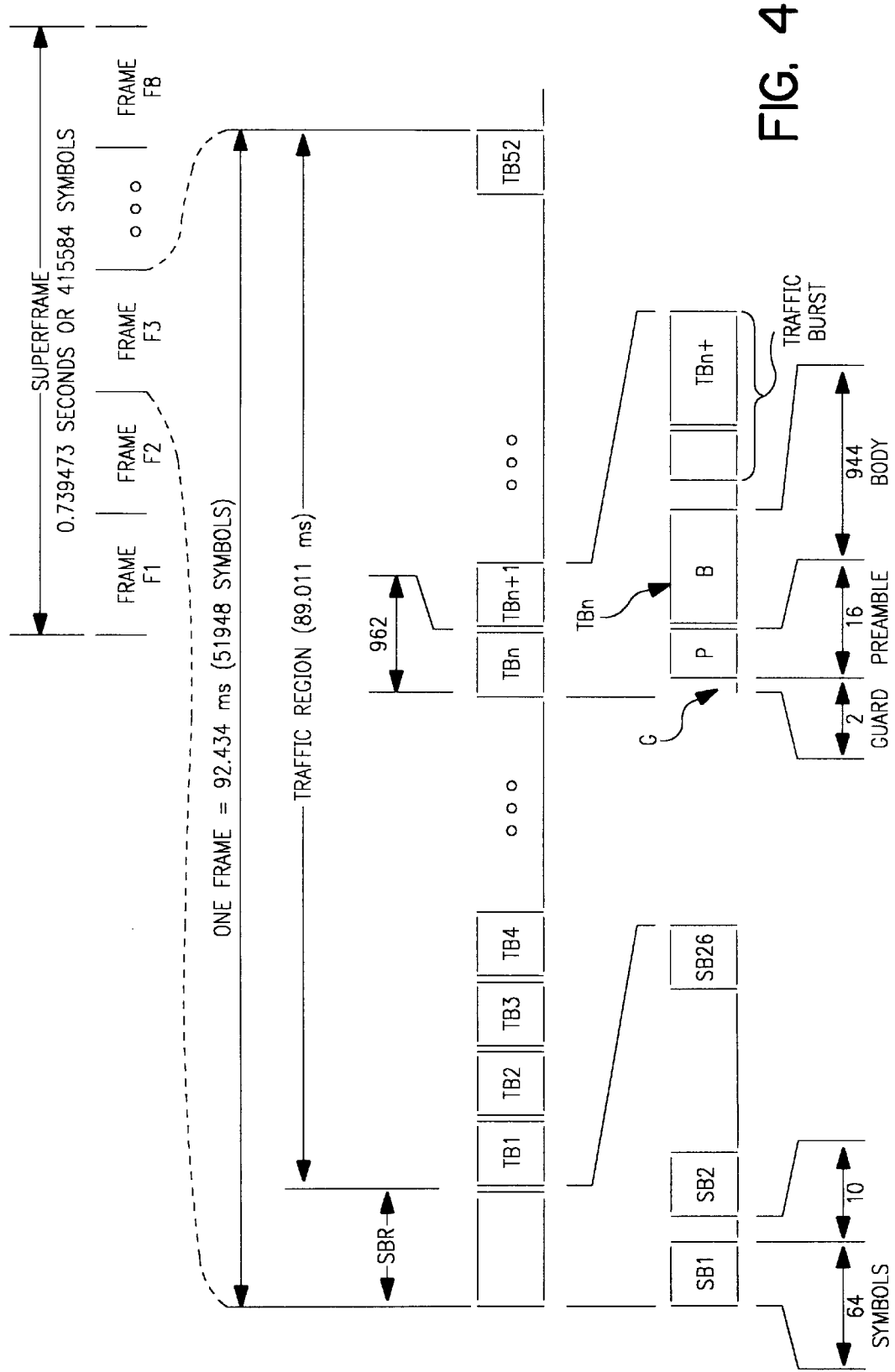
FIG. 4 illustrates a time layout of an uplink frame format in accordance with a preferred embodiment of the invention.

The techniques and parameters constituting the transmission system are illustrated in FIGS. 3 and 4. The techniques detailed below achieve high system capacity multiple-access via a combination of space-division, frequency-division, and time-division approaches which efficiently use the regulatory bandwidth allocation for this service. The modulation techniques selected for uplink use are integrated with forward error correction coding techniques that minimize the required power to close the links given the Ka-band propagation conditions and hardware-driven system cost constraints.

One gigahertz of RF spectrum is available for use by the uplink of each satellite. The allocated spectrum in the Ka-band (30 GHz up and 20 GHz down) is divided into eight bands of 125 MHz each which are used in pairs in each of the forty-eight beams formed by the antenna 406. Typically, four of eight bands are used in a given satellite. A four-frequency re-use strategy among the beam coverage areas results in each of the frequencies being reused 12 times for a 500 MHz RF bandwidth for the uplink for a given satellite. The reuse includes specific frequency bands with a four cell cluster configuration. Each satellite uses circular polarization, either right hand, left hand or both.

Each 125 MHz uplink band is divided into seven subbands, within which may exist a single X channel, or five Y channels or twenty-five Z channels.

Signaling uses "25% square-root raised cosine" pulse shaping on quadraphase phase shift keying (QPSK) at the symbol rates stated below for X, Y, Z type channels within each subband.

Signaling within each subband is in one of three channel types, designated as rate X, Y, & Z, as follows:

(1) Rate X is single carrier of 14.050 megasymbols per second;

(2) Rate Y is a single carrier of 2.810 megasymbols per second being one fifth the rate of an X channel and allowing up to five type Y channels, equally spaced, to exist within a subband; and (3) Rate Z is a single carrier of 0.562 megasymbols per second being one twenty-fifth the rate of an X channel and allowing up to twenty-five type Z channels, equally spaced, to exist within a subband.

A feature of the subject transmission is that the symbol rates for the uplink are related by simple divisors to the downlink symbol rate which, in the preferred embodiment, has a downlink symbol rate of 98.35 megasymbols per second. The divisors for the X, Y, & Z cases referred to above are, respectively, 7, 35 & 175 which yield, respectively, the symbol rates 14.050, 2.810, and 0.562 megasymbols per second, as referred to above. These precise relationships facilitate precision clocking of the uplink demodulators.

Another feature of the subject transmission method is that the channel spacing ratio is an integer ratio, being 5/4 or 125% in the preferred embodiment. The inter carrier frequency spacing is 17.5625 MHz for X channels, 3.5125 MHz for Y channels, and 702.5 KHz for Z channels. These precise placements facilitate separation of the various signals in a band by the satellite channelizer. The channel spacing ratio is the inter carrier frequency spacing in MHz divided by the symbol rate in megasymbols per second.

Multiple access is provided by means jointly of frequency division (with channelization as described in the paragraph above and subparagraphs (1)–(3) above) and of time division (with slotting as described in the paragraphs (4)–(6) immediately below).

There are six distinct time frame organizations, two for each of the three types of frequency channelizations, depending on the type of coding heavy "H" or light "L" in use on the channel. Thus, there are frame types XH, YH, ZH, XL, YL, ZL. All frame types have a common duration of 92.434 milliseconds.

(4) Frame types XH and XL span 1,298,700 symbols and contain 650 slots for synchronization bursts. Type XH and XL have, respectively, 650 and 1300 slots for traffic bursts.

(5) Frame types YH and YL span 259,740 symbols and contain 130 slots for synchronization bursts. Type YH and YL have, respectively, 130 and 260 slots for traffic bursts.

(6) Frame types ZH and ZL span 51948 symbols and contain 26 slots for synchronization bursts. Type ZH and ZL have, respectively, 26 and 52 slots for traffic bursts.

A dedicated slot for transmission of a synchronization burst of 64 symbols in a 74 symbol slot is provided for each active or standby terminal at intervals of 8 frames into one of 650, 130, and 26 synchronization slots on each channel of type X, Y and Z, respectively. These bursts are BPSK symbol sequences derived from a maximal length feedback shift register sequence and bear no information otherwise. Different phases (i.e., cyclic rotations) of the basic sequence are used in different beams of the same color.

Transmitted bursts comprise 1888 block coded symbols plus a 32 symbol preamble for frame types XH, YH, ZH, and 944 symbols plus a 16 symbol preamble for frame types XL, YL, and ZL.

The blocks of symbols are organized as four ATM cells, each of 53 bytes, together with 24 bytes of redundancy to form a (236, 212) Reed-Solomon outer code, which may be sent as lightly coded blocks. Such lightly coded blocks occupy 944 symbols.

To form a heavy code block, a light code block is subjected to further encoding such that 4 bit nibbles of the block are expanded to an 8 bit byte using a so-called Reed-Muller code to yield a biorthogonal signal set over four QPSK channel symbols. Such heavily coded blocks occupy 1888 symbols.

Initial entry (also known as entry order wire or EOW) signaling is based on usage of a traffic slot in a ZH type channel and has a burst structure comprised of a 320 symbol pattern derived from a maximal length shift register sequence to which is postfixed a short coded message that identifies the terminal entering the system.

Except for the initial entry bursts and the synchronization bursts, all uplink communications, including control, are achieved using traffic bursts bearing ATM cells.

As shown in FIG. 3, a 1 GHz spectrum of available frequencies is divided into two 500 MHz bands. The first 500 MHz band is divided into 125 MHz bands A1, B1, C1 and D1. The second 500 MHz band is divided into 125 MHz bands A2, B2, C2 and D2. Typically one band is used for a given satellite.

A representative 125 MHz band C1 within the allocated Ka-band spectrum is shown. This frequency serves a given area of antenna coverage (a ground cell) on a particular polarization. The C1 band is divided into seven sub-bands X1–X7, as shown, each with a bandwidth of 17.5625 MHz. Each such sub-band may be used in one of three channelization modes. In modes X, Y, & Z the subband accommodates one X, five Y, or twenty-five Z channels, at 14.050, 2.810, or 0.562 megasymbols per second, respectively. Within a subband, the multiple Y and Z channels are centered on frequencies separated by 3.5125 MHz and 0.7025 MHz, respectively. For example, channel X2 is shown divided into 5 Y channels Y1–Y5, and channel X6 is shown divided into 25 Z channels Z1–Z25.

In FIG. 4, the time structure of the uplink transmission system is depicted. The diagram is specific to a ZL channel. The other five channel types have somewhat different structure. Dimensions are in symbols. Time is organized into super frames of duration 0.739473 seconds or 415,584 symbols consisting of eight frames, F1–F8, each of 92.434 milliseconds duration. Uplinking terminals access their synch burst slots once per masterframe and traffic burst access is once per frame for each traffic slot allocated to the terminal. Each frame consists of two regions, a synch burst region SBR (3.423 ms) and a traffic burst region TBR (89.011 ms). The duration of the SBR and TBR is the same for all six frame types. The number of slots in each region depends on the channel type. FIG. 4 shows specifically the ZL case, for which there are 26 synch burst slots SB1–SB26 and 52 traffic burst slots TB1–TB52. The YL subchannel carries five times as many synch burst slots and traffic burst slots as the ZL subchannel. The XL channel carries 25 times as many synch burst slots and traffic burst slots as the ZL subchannel. Other cases are similar, but differ in the number of traffic bursts and synch bursts. FIG. 4 also shows that synch bursts, such as SB1, are 64 symbols in duration and are accommodated in 74 symbol slots. Synch bursts have the same structure for both light and heavy code channels. The synch bursts are generated at times determined by synchronizing burst timing signals received from downlink antenna 112 (FIG. 1). Additional details about such timing signals are described in the application entitled "Synchronization Method For A Processing Communication Satellite," U.S. patent application Ser. No. 09/408,965, filed herewith in the names of David A. Wright, et al. which is incorporated by reference into this application and is assigned to the same assignee.

FIG. 4 shows in more detail light code traffic burst TBn which is made up of a body B of 944 symbols corresponding to four ATM cells after coding by a Reed-Solomon (236, 212) code and a preamble P of 16 symbols or 960 symbols total. A guard band G of 2 symbols duration precedes preamble P. Light code traffic bursts are accommodated in slots of 962 symbols. For channels used with heavy code, the number of symbols is doubled, and the burst body bears the same four cell outer codeword, but with each nibble thereof expanded to a byte through the (8,4) biorthogonal inner code. The code rate for the light code is a multiple of the code rate for the heavy code. Preferably the multiple is two.

The precise range of frequencies allocated by the Federal Communications Commission (FCC) for commercial Ka-band operations in the Fixed Satellite Service (FSS) for the USA is 28.35 to 28.60 plus 29.250 to 30.000 GHz for the uplink and 19.2 to 20.2 GHz for the downlink. For non-USA coverage areas following ITU regulations (typically served by a separate satellite), the uplink allocation is 29.00 to 30.0 GHz in a contiguous band. The total bandwidth allocation is 1000 MHz each for both uplink and downlink service.

As used by satellite 100, the allocated spectrum is divided into eight bands of 125 MHz each. The bands are coupled in four sets of two for use in the four categories ("colors") of beams present in the geographical coverage pattern. These bands and their associated colors are set out in Table 1:

| U/L Band ID Color | Uplink Band Range, GHz |
|---|---|
| A1 | 28.350–28.475 (FCC) |
|    | 29.000–29.125 (ITU) |
| A2 | 28.475–28.600 (FCC) |
|    | 29.125–29.250 (ITU) |
| B1 | 29.250–29.375 |
| B2 | 29.375–29.500 |
| C1 | 29.500–29.625 |
| C2 | 29.625–29.750 |
| D1 | 29.750–29.875 |
| D2 | 29.875–30.000 |

Satellite 100 uses circular polarization on both the uplink and the downlink. The polarization is right hand, left hand or both. All transmissions from and to a single satellite are co-polarized across the entire spectrum, with the opposite handedness being used for transmit and for receive. The concept of operations permits the option of placing a second satellite using the orthogonal polarization at the same longitude, with the same frequency coverage, and the same geographical coverage to double the frequency reuse.

Figure 5:
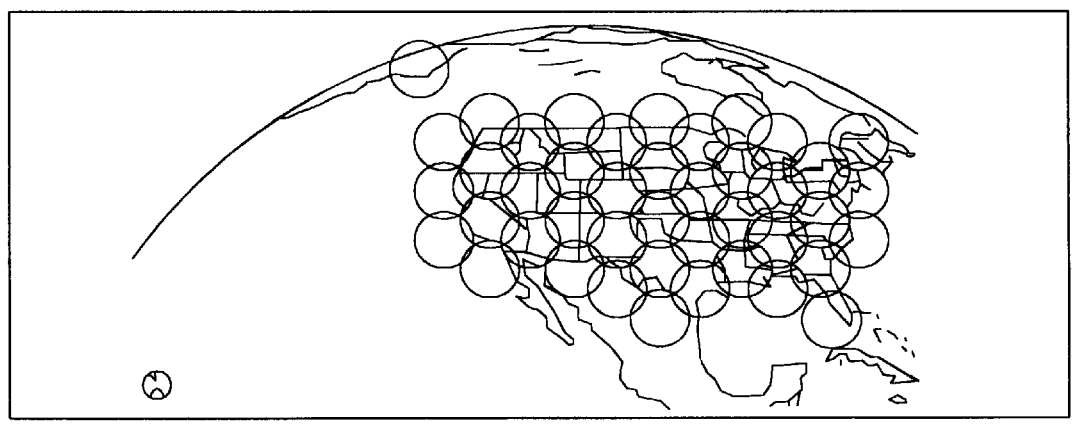
FIG. 5 is an illustration of a preferred form of beam lay down pattern for use in connection with the preferred form of the present invention.

Satellite 100 uses multiple spot beams to permit high quality link performance via cellular beam coverage areas with higher gains and to obtain frequency re-use where spatial isolation among beams allows the same frequency band to be used for multiple areas. In a representative beam layout for the geographical coverage area of the contiguous, continental United States (CONUS), there are 48 beams with coverage as shown in FIG. 5.

Satellite 100 achieves high spectral efficiency by using each band of frequencies repeatedly across the geographical coverage area. In the representative beam layout illustrated in FIG. 5, there are four distinct classes of beams (i.e., A, B, C, and D for the uplink and downlink.) Each class has twelve members for a forty-eight beam geographic coverage, and is referred to as a "color" with each beam in the color using the same pair of bands.

Figure 6:
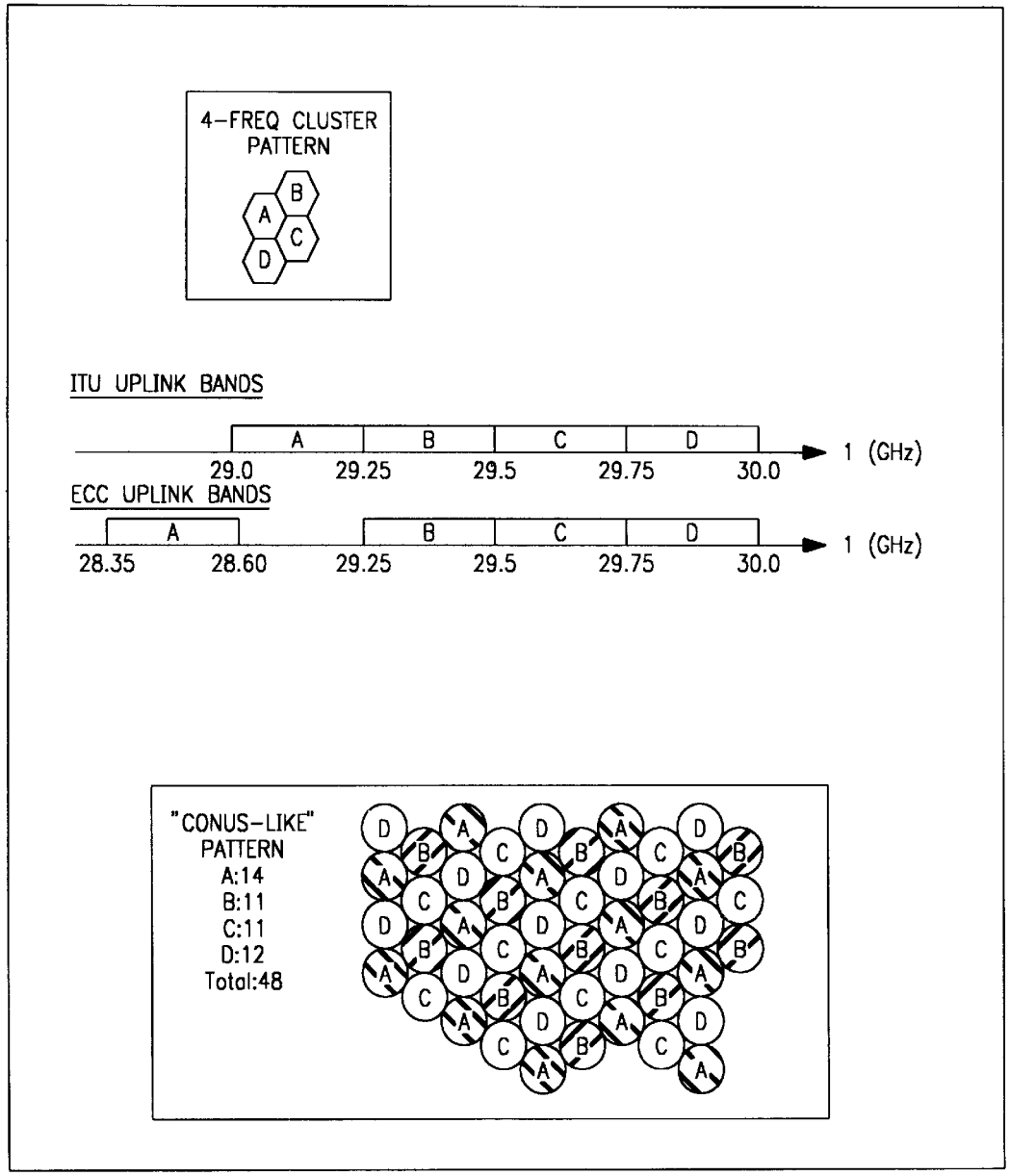
FIG. 6 illustrates a preferred form of multibeam coverage pattern and uplink bands enabling frequency reuse in accordance with the preferred form of the invention.

FIG. 6 shows how hexagonal beam tessellation using a cluster of four frequencies can be used to construct a 48-beam pattern. For an irregular overall pattern, there may be an unequal distribution of the four frequencies which depends on the pattern's shape, as shown for example by the CONUS coverage of FIG. 6.

For a single satellite 100 with a regular coverage pattern (FIG. 6), each of the four pairs of uplink and downlink frequency bands is re-used 12 times in the 48-beam coverage area by spatial frequency re-use: that is, a total of 6.0 GHz of bandwidth is available at the satellite for both the uplink and the downlink. When a pair of satellites using circular polarization operates from the same geostationary orbital location into the same geographical area, polarization frequency reuse will double the re-use factor to 24.

Satellite 100 relies on a negligible probability of bit error subject to a discarded cell ratio of a few parts per million when a communication link is at the threshold of performance. This high integrity approach is realized by the use of powerful error control techniques.

A central consideration in the design of a Ka-band system is the need to provide a substantial link margin to accommodate the effects of rain, which become quite severe at these frequencies. This margin is attained in the satellite 100 by applying a second level of error control. Since the additional margin is needed only part of the time, this second layer of coding is deployed adaptively, so that the additional bandwidth required to support it does not penalize UETs operating under clear sky conditions. Additional details about such adaptive coding is explained in U.S. application Ser. No. 09/163,775, filed Sep. 30, 1998 in the names of David A. Wright et al., entitled "Adaptive Coding Scheme For A Processing Communications Satellite," which is incorporated by reference and is assigned to the same assignee as the present application.

To achieve reasonable efficiency between payload and overhead components and to permit strong error control codes to be exploited, it is necessary to aggregate a few cells together into a composite uplink block. To avoid excessive latency, it is important that the number of cells so aggregated not be too large. Blocks of four cells offer superior performance. Since each cell typically has 53 bytes, the basic information content of each block is 212 bytes.

Each 212 byte (or octet) information block is adjoined with 24 bytes of parity to form a codeword in a (236,212) Reed-Solomon error correcting code. This code has the property that all patterns of 12 or fewer byte errors are correctable when the received version of the 236 bytes is subjected to decoding by a standard BCH decoding algorithm. As a side benefit, the decoding process almost always detects the presence of more than 12 errors with the result that such undecodable cases may be discarded rather than risk misdirection of the cells contained therein.

The outer code is based on a threshold byte error rate prior to decoding of 1.2%. For this input error rate, the probability that 12 or fewer errors are present in a block of 236 bytes may be shown to be about 7 parts per million, which is the threshold cell loss rate due to channel imperfections.

The link design calls for routine operation at one decibel above threshold, at which point the input error rate drops to about 0.24% and the concomitant probability of undecodability drops to less than 1 part per trillion. As noted above, the probability of decoding a block incorrectly is so small as to be negligible, even at threshold.

Inner coding is applied to the uplink and downlink for UET 400 on an as-required basis to form heavy code blocks For lightly coded traffic, no inner coding is applied. When required to mitigate unfavorable link conditions, a rate 1/2 inner code is used on the uplink.

The preferred form for the uplink inner code is a short binary block code of rate 1/2. Short block codes are preferred over convolutional codes in this application because the usual strategy of interleaving to break up the clusters of errors that appear when a convolutional code is decoded by a Viterbi decoder is impractical for the low speed uplinks typical of low cost earth terminals because of excessive latency. One form of block code that is satisfactory for the subject transmission is known in the literature as the "Nordstrom-Robinson". This code has a minimum distance of 6. When decoded with soft decisions using the Chase Algorithm, this code has a byte error rate of 1.2% when the input energy per component to noise ratio (Ec/No) is 0.5 dB (theoretical ideal).

Another suitable form of block code that is suitable for the inner code is the (8,4) Reed-Muller code which forms a biorthogonal signal set and which yields a byte error rate of 1.2% for Ec/No=1.5 dB. In the preferred embodiment, this biothogonal code is intended as the inner code.

A frame structure is imposed in both the uplink and the downlink satellite 100. The downlink frame structure permits the separation of the heavily and the lightly coded portions of the downlink and forms part of the overall synchronization system that ensures the uplink bursts arrive at the satellite with a highly precise time placement. The uplink frame structure serves to define individual channel slots "chanslots" in each of the uplinking channels including multiple frequency TDMA channel slots.

The frame is divided into various channel slots as shown in FIG. 4. Each channel slot may be occupied by a burst of the same nominal number of symbols and comprised of a 36 (18) symbol preamble and a 1888 (944) symbol body for heavily (lightly) coded channels, respectively.

In the preferred embodiment, the preamble includes an all-purpose synchronization sequence of 32 (16) symbols and a guard time of 4(2) symbols for heavy (light) coded channels, respectively. The body of the burst contains the 236 byte Reed-Solomon coded block in the case of lightly coded channels (944=236*8/2) and where each QPSK symbols bears two bits of the coded block.

The body of heavily coded bursts is twice as long (1888= 944*2) due to the application of the inner code for the heavily coded case—equivalently, the body is comprised of 472 code words of the biorthogonal inner code, each of 8 bits or 4 symbols, and associated in nibble pairs with the bytes of the Reed-Solomon code.

There are no overt frame markers present in the uplink since the uplink frames are defined in terms of satellite timing as conveyed to the UETs via a time-stamp present in the downlink frame and by range information.

Square-root raised cosine pulse shaping with a roll off factor of 25% on phase shift keying (QPSK) is the basis of uplink signaling. The signaling rate (symbol rate) is in the ratio of 175, 35, and 7 to 1 between the 98.35 megasymbols/ sec. downlink and the 562, 2810, 14,050 K symbols/sec. uplinks, respectively.

The uplink preamble serves to permit the satellite demodulator to acquire the phase of the burst arriving on the uplink and provide guard time. The length of the preamble for use with heavily coded blocks (36 symbols) is twice that for lightly coded blocks (18 symbols) to maintain a two to one occupancy ratio between the two modes and to accommodate the significant difference in setpoint power (and signal to noise ratio) for these two modes. Additional details about synchronizing the operation of satellite 100, NOC 300 and UET 400 is described in U.S. patent application Ser. No. 09/408,965, entitled "Synchronization Method For A Processing Communication Satellite," filed herewith in the names of David A. Wright et. al., and which is incorporated by reference and which is assigned to the same assignee as the present application.

Figure 7:
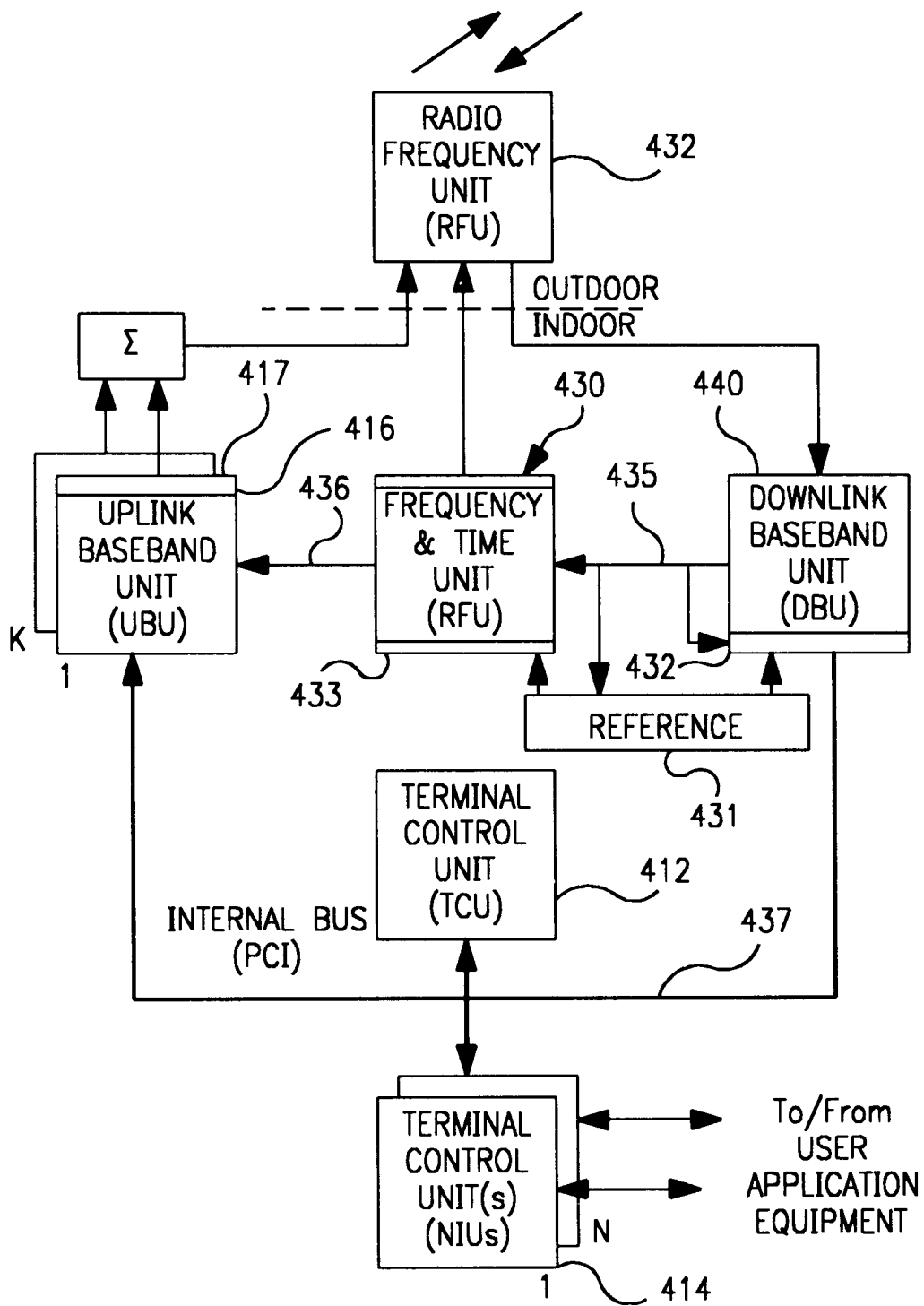
FIG. 7 is a schematic block diagram illustrating a preferred form of earth terminal uplink transmission equipment and downlink reception equipment made in accordance with the invention.

Referring to FIG. 7, under direction from the UETs Terminal Control Unit (TCU) 412, ATM cells (53 bytes each), are placed on the internal bus of UET 400 just prior to the launch time of an uplink burst. These cells may originate from any of the Network Interface Units (NIUs) 414 present in the UET for which connections are currently established and/or may emanate from TCU 412 itself. In the event that four cells are unavailable to fill a scheduled burst, the TCU 412 will create null cells to fill out the block. Cells placed on the bus are routed to a specific Uplink Baseband Unit such as unit 416 (FIG. 2). (Smaller stations will have only a single Uplink Baseband Unit.) All uplink addressing (VPI/VCI) assignment and other constituents of the cell header (i.e., the PTI and CLP fields) are completed prior to presentation of a cell to the uplink transmission process.

After receiving four cells from the bus, the Uplink Baseband Unit (UBU) 416 buffers these as a single block of 212 bytes which forms the information component of a Reed-Solomon codeword. These 212 bytes are processed by a Reed-Solomon (RS) encoder 418 in the UBU (FIG. 2) to produce a 24 byte parity suffix which is adjoined to the information component to form a 236 byte RS codeword. This codeword forms the body of the uplink burst when light coding is used or is passed to the inner encoder for further encoding when heavy coding applies.

For heavily coded uplinks, the Reed-Solomon codeword is encoded further using the biorthogonal inner code encoder. This encoder operates on a nibble (half byte) basis to convert each byte of the RS code to a pair of encoded biorthogonal words of one byte each. This doubly encoded block of 472 bytes total forms the body of the burst when heavy coding applies.

After uplink encoding processes are completed, the burst body is reorganized as a dibit stream for presentation to the I,Q paths of the uplink modulator 420 (FIG. 2) in UBU 416 which will convert the dibits to QPSK symbols. A diagram of the uplink format and modulation timing is shown in FIG. 4. Prior to passage to the modulator, the uplink burst assembly process is completed by prefixing a preamble sequence to the body of the burst. The nominal length of preamble is 18 (36) symbols for the lightly (heavily) coded case. (Some of the preamble symbols are actually null to provide guard time.) At this point the burst length is nominally 962 (1924) symbols for the lightly (heavily) coded forms, respectively.

At a precise launch instant (determined by the UET's synchronization function) the UBU 416, commences to feed the burst into the modulator 420 at a rate of one dibit every 1.78 microseconds (562 kHz).

The modulator 420 produces a shaped QPSK signal version of the burst using the burst dibit input described above which is translated to a first IF frequency. The symbol intervals are determined precisely using a divided down (by 175, 35, or 7) version of the UET's internal 98.35 MHz downlink symbol clock. Uplink power control also is effected at this point in the processing path by adjusting the level of a first IF amplifier 417 in steps of approximately 0.125 dB as directed by the power control algorithm within the UET 400.

Each UBU in UET 400 has a reference oscillator 431 which generates reference pulses and drives frequency synthesizers in the Frequency and Time Unit (FTU) 430 (FIG. 7) which can produce any one of 175 (or 35 or 7) separate local oscillator frequencies on 0.7025 MHz spacing—to facilitate placement of a burst into its assigned uplink channel. Oscillator 431 is divided to form a downlink symbol clock 432 which generates pulses which in turn, are used by oscillator 431 to generate an uplink symbol clock 433 which generates pulses at a frequency which is an integer multiple of the frequency of the pulses generated by downlink symbol clock 432. The synthesizers have a stabilization time of less than the shortest uplink burst (1.718 ms for lightly coded bursts) so that many channels may be accessed within a frame period (92.434 ms). The uplink burst at first IF is converted to a second, channelized, IF using this synthesized LO frequency. For UETs with multiple uplink capability, these second IF signals are combined into a composite IF by means of a power combiner. The second IF signals are in the range of 950 to 1200 MHz and are transported from the indoors portion of the UET 400 to the outdoors part 432 by means of a coaxial cable.

At the outdoor unit 432, the composite IF is unconverted to the appropriate uplink frequency band (in the vicinity of 30 GHz) for the UET in a block upconversion process. The local oscillator for this upconversion is switch selectable to any of the eight bands used by the satellite 100.

The uplink 30 GHz signal is amplified by means of the UET's HPA 422 (FIG. 2) to a suitable level for propagation to the satellite 100. For smaller stations, HPA 422 is a 2 watt solid state amplifier (rating at the one dB gain compression point). For larger capacity stations using the smallest aperture antenna, the HPA will be a 30 GHz range traveling wave device with a rating of approximately 7+10*log(K) dBW, where K is the number of Z type UBUs required to support the station's peak uplink rate. Terminals for Y or X type uplinks will use different power ratings for their HPA.

For example, for a "T1" class terminal, four UBUs are required and the traveling wave tube (TWT) rated saturated power should be about 13 dBW or, equivalently, 20 watts, which provides for 4 dB output backoff to accommodate multicarrier operation without significant intermodulation effects. Note that the typical operating level for the HPA 422 is much lower than its rated value since power control is maintained in the uplink, and the full amplifier power is required only rarely under conditions of heavy rain. Note also that the HPA 422 rating may be reduced with larger aperture antennas as would typically be the case for high availability UETs.

The HPA's output is coupled into a 30 GHz waveguide and into the transmit port of the antenna's feedhorn assembly. The feedhorn illuminates the antenna parabola which collimates the uplink energy into a narrow beam for upward propagation. The minimum antenna size is 75 centimeters, which is applicable only to moderate availability UETs.

The uplink signal then propagates to the satellite 100 subject to spreading losses, absorption, and rain fading.

Figure 8:
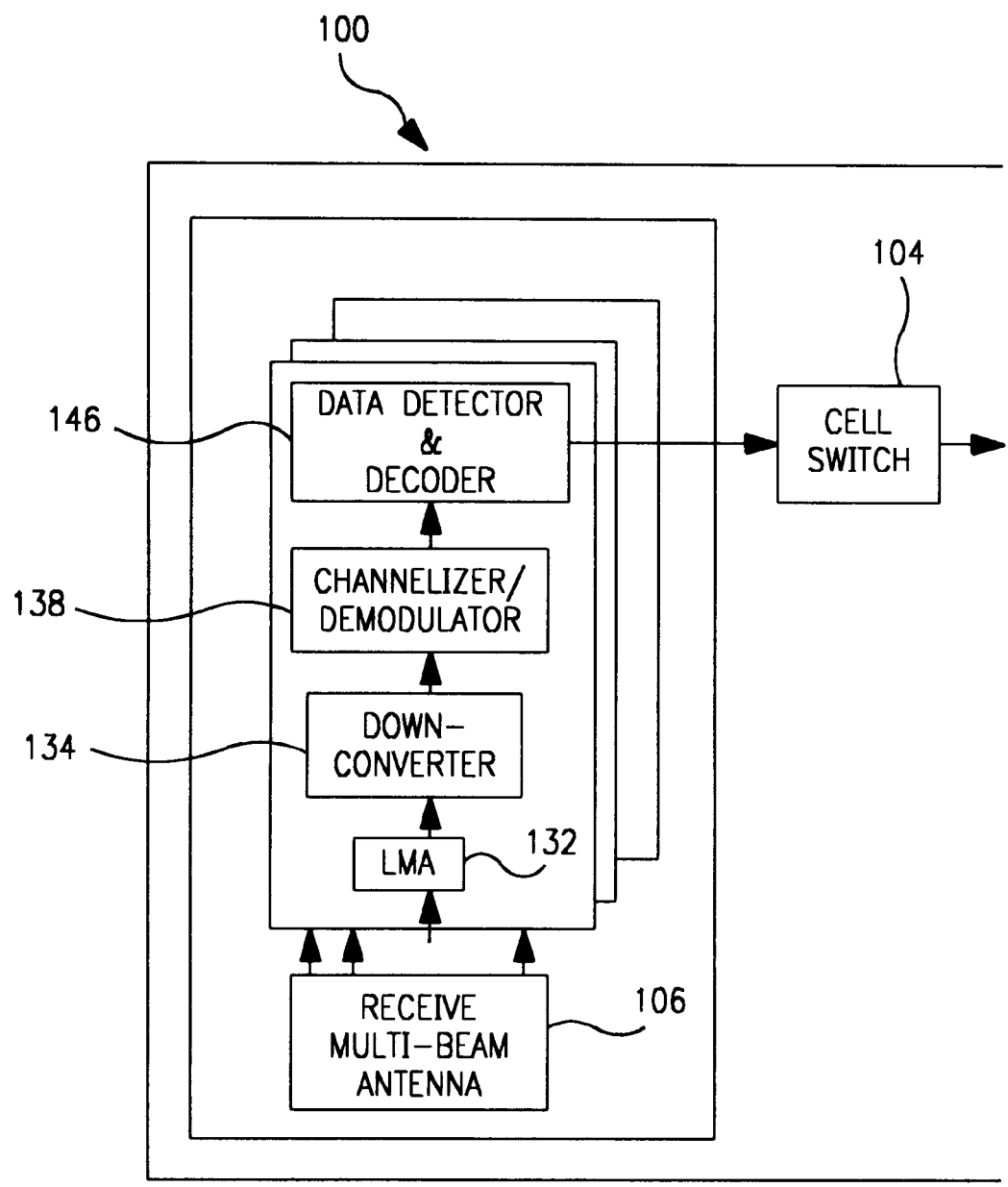
FIG. 8 is a schematic block diagram of a preferred form of satellite reception apparatus made in accordance with the present invention.

This uplink transmission activities occurring in the satellite 100 and the equipment enabling these activities are described with reference to FIGS. 8 and 9.

The uplink signals from concurrently active channels (125 MHz band) are collected by one of the satellite's 30 GHz uplink antennas 106 and the feed element associated with the uplinking beam. These signals arrive from various directions relative to the center of the beam and with power levels that are higher for off-axis locations than for mid-beam (to compensate for receive antenna gain rolloff at the edge of coverage). After collection by the antenna 106 and feed combination, however, all heavily coded signals excite approximately the same power level per channel at the input to the low noise amplifier (LNA 132) for the band as a result of the power control procedure. Similarly, all lightly coded channels have a common power level at the LNA, but this power level is several dB higher than the heavily coded power level (typically 7 dB) because of the differing values of Ec/No at the setpoint and the increased interference experienced with the light code. The feed elements enable the satellite to separate beams originating from different locations on the earth in a well-known manner.

The incoming band of 30 GHz signals from the antenna feed is passed through low noise amplifier 132 in preparation for further processing of the uplink signals. The amplifier provides initial gain and, together with other noise sources, results in a satellite system temperature of approximately 800° Kelvin.

The 125 MHz band signal output from LNA 132 is then downconverted in a downconverter 134 from the 30 GHz region to an intermediate frequency by means of a down converter mixer 135 (FIG. 9) which reduces the carrier frequency to an intermediate (IF) frequency and an IF band pass filter 136 prior to presentation to the satellite channelizer demodulator 138.

Figure 9:
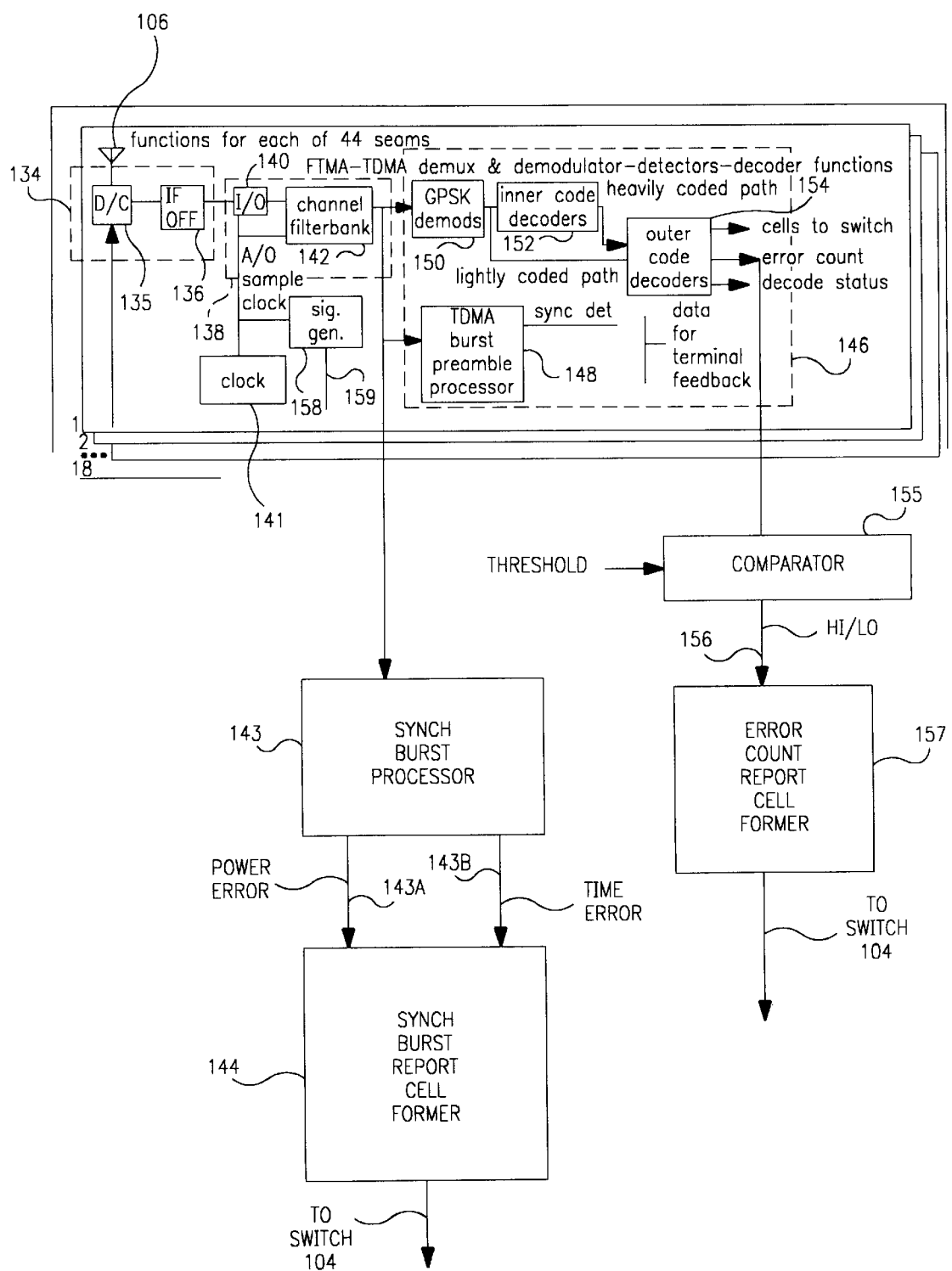
FIG. 9 is a schematic block diagram illustrating additional details of the circuitry shown in FIG. 8.

Referring still to FIG. 9, the data content borne by the multiple uplink channels in a given band is extracted by a parallel processing demodulator 138. This device begins its processing by sampling and digitizing the band signal in an analog to digital converter 140 based on clock signals from a clock 141. The sampling rate is synchronous with the intermediate frequency on which the band rides so that both the inphase (I) and quadrature (Q) components are preserved. Clock 141 also provides clock signals for timing demodulators 150 and decoders 152 and 154.

These samples are aggregated into sets of consecutive samples which are then subjected to a discrete Fourier transform (DFT) in a first channelizer 142 which resolves the 125 MHz band into 7 subbands, (X channels) and which includes integral matched filtering to the square root raised cosine shaping function. For Y and Z channels, a second channelizer follows which resolves the X channel into 5 or 25 constituents, respectively, and which also includes integral matched filtering.

Complex samples from the channelizer/matched filter 142 are passed to a multichannel demodulator 150, a synchronization burst preamble processor 148 which generates a synch detect signal on an output, and an initial entry processor for recovery of the baseband information content of, respectively, traffic bursts, synch bursts, and initial entry bursts (EOW). The processing action of these three processors are described in, respectively, U.S. patent application Ser. No. 09/408,261, filed herewith, in the name of Dominic Carrozza, et al., entitled "Synchronization Burst Processor for a Processing Satellite", U.S. patent application Ser. No.

09/270,167, filed Mar. 16, 1999, entitled "Initial Entry Processor for a Processing Satellite", and U.S. patent application Ser. No. 09/407,921, filed herewith, in the name of Dominic Carrozza, et al., entitled "Uplink Demodulator Scheme for a Processing Satellite" which are incorporated by reference and which are assigned to the same assignee.

The output of device 142 also is transmitted to a synch burst processor 143 which measures the received energy and time of arrival at satellite 100 of uplink synch bursts SB1–SB26 (FIG. 4) in each uplink frame. The details of such measuring are described in the above referenced U.S. patent application Ser. No. 09/408,261, filed herewith, in the name of Dominic Carrozza, et al. which is incorporated by reference and assigned to the same assignee as the present application. A signal representing the received energy is generated on output 143A (FIG. 9) and a signal representing the time of arrival of the synch bursts at satellite 100 is generated on output 143B. The outputs are transmitted to a synch burst report cell former 144 which forms report cells as ATM cells that incorporate the information received from outputs 143A and 143B. Former 144 also includes in the report cells an address which identifies a ground terminal and an identifier indicating that the report cells contain information relating to the information received from outputs 143A and 143B. The report cells generated by former 144 are transmitted to switch 104.

During processing of the body of the burst, the complex channelizer outputs are routed to a QPSK demodulator 150 which includes a decision directed phase locked loop which tracks the incoming channel carrier and coherently recovers the dibit data content of the 944 (or 1888) QPSK symbols in the body of the burst. The output of the demodulator 150 is in the form of I,Q soft decision pairs with 4 bits of resolution for subsequent processing by an inner code decoder 152.

Among the channel outputs from the demodulator, many of these are heavily coded channels and require processing of the inner code prior to outer code decoding. The outer code used on the satellite uplink is known as a biorthognal code consisting of 16 vectors in a space of 8 dimensions. Alternatively, it may be a Nordstrom-Robinson code consisting of a set of 256 vectors in a space of 16 dimensions, with each such vector falling on one of the vertices of a sixteen dimensional hybercube. In the following, discussion of the processing steps is limited to the biorthogonal code alternative.

The inner code decoder first aggregates a 4 component "observable" vector by buffering 4 consecutive I, Q outputs for a channel from the demodulator. The inner code decoder then locates the code vector closest (in Euclidean space) to the observable vector and assigns the related information nibble as its output. This process is known as "maximum likelihood" decoding. Decoded nibbles are aggregated in pairs to form bytes which are passed to a byte buffer to assemble a block for decoding.

In the case of lightly coded channels, the inner decoding process consists merely of extracting the hard decision (most significant bit) from the demodulator output and organizing these into bytes which are passed to a byte buffer in preparation for the outer decoder's action.

Each burst arriving in the uplink requires decoding of the (236,212) Reed-Solomon outer code. Blocks of 236 received bytes from the various uplink channels are assembled in buffer as they become available. As complete received blocks become available, the outer code decoder 154 is scheduled to decode the block. This decoding follows the standard technique for decoding any BCH code (of which the RS codes are a subset). The RS decoder performs three basic steps:

Forms a 24
byte syndrome polynomial from the 236 byte received polynomial (i.e. the received block);
Processes the syndrome polynomial using Euclid's Algorithm to produce the error locator polynomial and the error identifier polynomials; and
Locates and corrects any errors among the 236 byte received block.

Whenever there are 12 or fewer byte errors in the received block, the BCH decoding method will correct all errors. The number of errors corrected is readily available when the decoding process completes normally. For almost all cases where there are more than 12 errors, there are various abnormal symptoms that are manifested by the processing steps. Such cases are known as "decoder failure". Whenever a decoder failure is sensed, the associated block is discarded since it is known to be unreliable. By design, the probability of decoder failure is a few parts per million at the threshold (faded limit) for uplink operation. The probability that a block containing more than 12 errors decodes without exhibiting decoder failure is very small so that the probability that data is received in error in the satellite system is negligible.

The error count from decoders 154 are transmitted to a comparator 155 and are compared with a threshold count. If the number of errors is above the threshold, a error bit is set high on output 156. An error bit is generated for each traffic time slot of each channel shown in FIGS. 3 and 4. For example, in each ZL frame, there are 52 traffic or data time slots; there are 25 ZL frames per X channel; and there are 7X channels per band. Thus, for ZL frames, there are a total of 52X25X7X9100 traffic time slots. Thus, 9100 error bits are generated. The error bits are packed into ATM cells by former 157 and are transmitted to switch 104.

The manner in which switch 104 reads the addresses of the ATM cells and places the cells on the proper downlink for transmission to the desired ground terminal is described in more detail in the application entitled "Satellite Communication Multicast Processing Techniques," filed herewith in the names of Gefferie H. Yee-Madera, et al., under U.S. patent application Ser. No. 09/407,416, which is assigned to the same assignee as this application and is incorporated by reference in this application.

Upon completion of the outer code decoding, the 24 byte parity portion of the block is discarded and the 212 byte information portion is separated into four 53 byte cells which are placed at the input for the uplink band into the satellite fast cell switch 104.

Referring to FIG. 9, signal generator 158 generates a synchronizing burst timing signal on a conductor 159. The timing signal on conductor 159 is conducted to cell switch 104, is processed by blocks 118 and 110 and is transmitted on the downlink by antenna 112.

Figure 10:
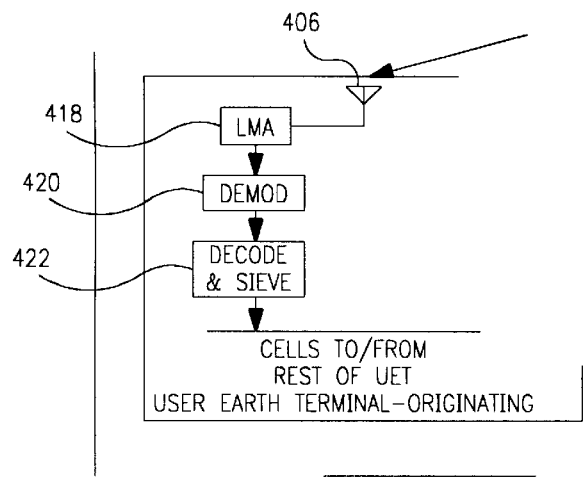
FIG. 10 is a preferred form of downlink transmission subsystem made in accordance with the present invention.

As shown in FIG. 10, RF interface 404 comprises a low noise amplifier 418, a demodulator 420 and a decoder and seive circuit 422.

Figure 11:
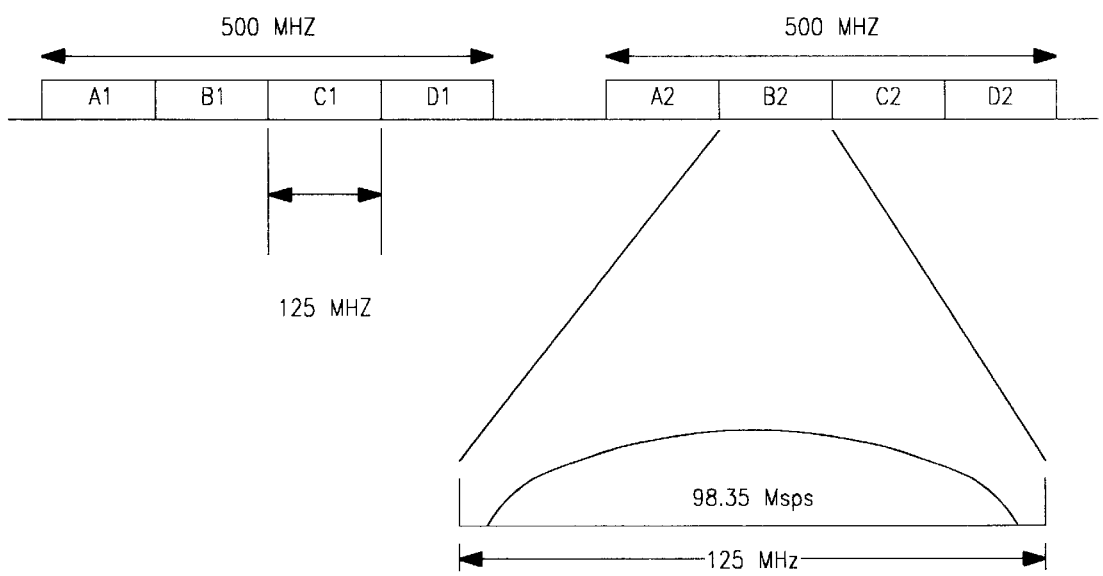
FIG. 11 is an illustration of a preferred form of downlink channelization made in accordance with the invention.
Figure 12:
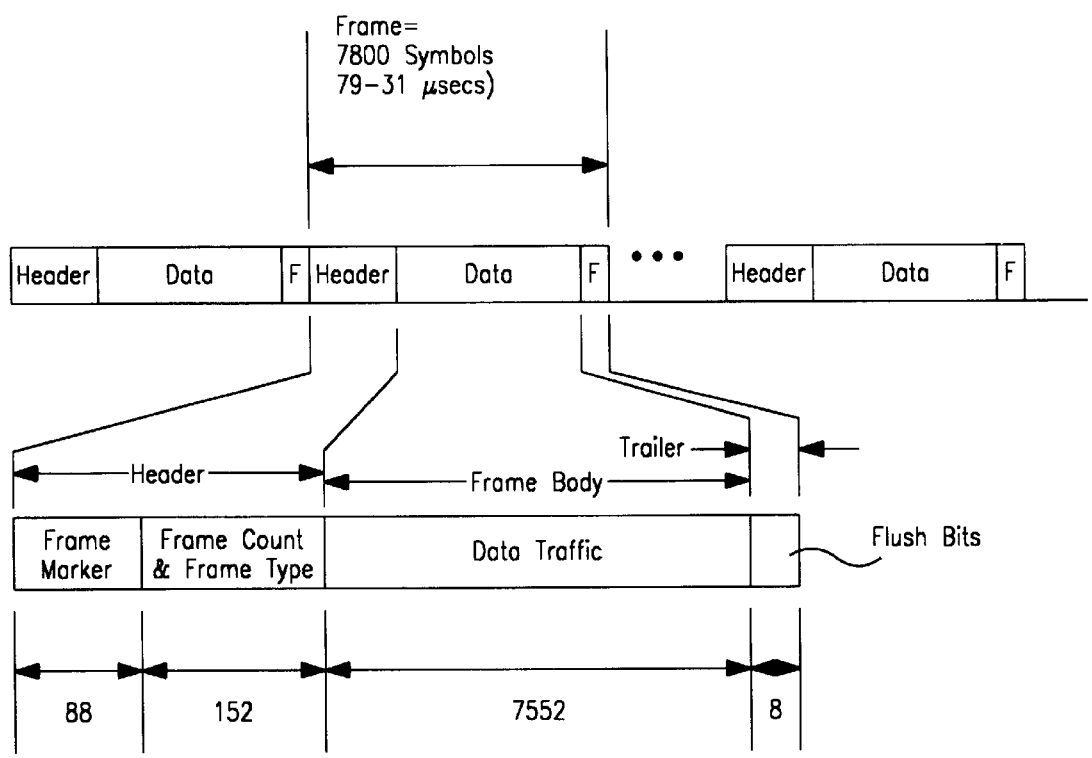
FIG. 12 is an illustration of a preferred form of downlink frame format in accordance with the invention.

The techniques and parameters used by the receiving portion of RF interface 404 are illustrated in FIGS. 11 and 12. The techniques detailed below achieve high system capacity multiple-access via a combination of spatial, frequency-division, and time-division approaches which efficiently use the regulatory bandwidth allocation for this service. The modulation techniques selected for uplink and downlink use are integrated with forward error correction coding techniques that minimize the required power to close the links given the Ka-band propagation conditions and hardware-driven system cost constraints.

One gigahertz of RF spectrum is available for use by the downlink of each satellite. The allocated spectrum in the Ka-band (30 GHz up and 20 GHz down) is divided into eight bands of 125 MHz each which are used in a cluster structure among the forty-eight beams formed by the satellite antennas 112. A four-frequency re-use strategy among the beam coverage areas provides 1 GHz times a quarter of 48 or 12 GHz of RF bandwidth for both uplink and downlink for a given satellite. The reuse includes specific frequency bands with a four cell cluster configuration on each of two polarizations. Each satellite uses circular polarization, either right hand, left hand or both.

Single carrier access of each downlink band is provided with a 98.35 megasymbol per second carrier. The ratio of the frequency range of the bands in cycles per second divided by the transmission rate in symbols per second is in the range of 1.2 to 1.3. The preferred ratio is 125 MHz/98.35 M symbols per second=1.271.

Staggered filtered quaternary phase shift keying (QPSK) modulation (alternatively, GMSK, or other modulation techniques) is used.

The downlink stream is divided into frames each of 7800 symbols, regardless of the coding type, whether a data frame is empty or not. Essential overhead is provided within the frames including:
- a frame marker sequence for delineation of frames within the serial downlink stream and for resolution of QPSK ambiguity;
- a non-repeating frame number, for use in uplink synchronization;
- a robust indicator of the inner code being used in the frame; and
- flush bits resulting from tailing off the inner encoder (e.g., tailing off of the process of generating the inner code).

The non-repeating frame number does not repeat over the expected life of satellite 100.

The payload data comprises twelve or twenty-four cells as the inner code rate is 3/8 or 6/8, respectively (alternatively, k*4 cells as the inner code rate is k/8, with k an integer less than or equal to 8).

Frames with no payload (essential overhead only) are provided to permit power gating of the downlink.

All payload data is protected by a concatenated error control method comprising:
- a (236, 212) Reed-Solomon code (being a shortened (255, 231) code) with each 236 byte code block bearing four ATM cells;
- a rate 6/8 "light" inner code or a rate 3/8 "heavy" inner code with the codes being convolutional in each case, and
- additionally, other inner codes, being of rate k/8, with k being an integer less than or equal to 8.

Three or six outer code blocks are interleaved, as the coding is heavy or light, respectively (alternatively, other interleaving consistent with the code rate (i.e., k of k/8)). The resultant interleaved structure is a bit array of dimension (236×64) for all values of k for a total of 15104 bits which map to 7552 quantenary symbols.

The inner coded stream is partitioned onto two separate, independently decodable, quadrature components.

ATM cells are used for conveyance of all downlink traffic both for users and for system management, including satellite position (ephemeris) information and status reports on user terminal's timing and error rate. Additional details about interleaving and providing identically-sized frames is described in U.S. application Ser. No. 09/169,875, entitled "Common Downlink Frame For Differing Coding Rates," identified as filed Oct. 12, 1998 in the name of David A. Wright which is incorporated by reference, and which is assigned to the same assignee as this application.

As shown in FIG. 11, a 1 GHz spectrum of available frequencies is divided into two 500 MHz bands for the downlink transmission system. The first 500 MHz band is divided into 125 MHz bands A1, B1, C1 and D1. The second 500 MHz band is divided into 125 MHz bands A2, B2, C2 and D2.

Each of the 125 MHz bands serves a given area of antenna coverage (a beam) on a particular polarization and contains a single 98.35 megasymbol per second high speed serial single axis TDM stream.

As shown in FIG. 12, the time structure of the 98.35 megasymbol per second high speed serial single axis TDM stream is shown. This stream is organized into frames of 7800 symbols with each frame containing a body of 7552 symbols, a header of 240 symbols, and a trailer or flush bits of 8 symbols. The dimensions of FIG. 12 are in QPSK symbols (98.35 megasymbols per second). The frame body bears 4 times K ATM cells and consists of K code words (Reed-Solomon (236, 212)) where K=3 or 6. An inner code of rate K/8 expands the size of the frame body to 7552 symbols for all K. The 240 symbol header consists of an 88 symbol frame marker and a 152 symbol frame count and frame type.

The 88 symbol frame marker can be tracked at signal to noise ratios (s/n) which are lower than the (s/n) at which data traffic in the frame body of the data frames can be successfully decoded. The tracking of the frame marker is achieved by correlating the known pattern of the frame marker (i.e., 88 symbols which occur at a known time in each frame) with the pattern of the frame marker being tracked. The correlation is positive if 88 symbols are successfully decoded in the frame marker being tracked.

The frame type is more robust than the data traffic in the frame body because the frame type symbols indicating whether a data frame is heavily coded, lightly coded, or contains null code are essential for the correct operation of the decoders. The frame type symbols are made robust by including 32 symbols of redundant and error control coding. A 64,3 code (sometimes referred to as an 8 fold repetition of an 8, 3 code) is utilized in which 3 information bits are used with 64 bits of redundant and error control coding.

As used by satellite 100, the allocated spectrum is divided into eight bands of 125 MHz each. The bands are coupled in four sets of two for use in the four categories ("colors") of beams present in the geographical coverage pattern. These bands and their associated colors are set out in Table 1:

| Downlink Band Range, GHz | D/L Band ID (color) |
| --- | --- |
| 19.2625 ± 0.0625 (19.200–19.325) | A1 |
| 19.7625 ± 0.0625 (19.700–19.825) | A2 |
| 19.3875 ± 0.0625 (19.325–19.450) | B1 |
| 19.8875 ± 0.0625 (19.825–19.950) | B2 |
| 19.5125 ± 0.0625 (19.450–19.575) | C1 |
| 20.0125 ± 0.0625 (19.950–20.075) | C2 |
| 19.6375 ± 0.0625 (19.575–19.700) | D1 |

-continued

| Downlink Band Range, GHz | D/L Band ID (color) |
|---|---|
| 20.1375 ± 0.0625 (20.075–20.200) | D2 |

Satellite 100 uses circular polarization on both the uplink and the downlink. The polarization is right hand, left hand or both. All transmissions from and to a single satellite are co-polarized across the entire spectrum, with the opposite handedness being used for transmit and for receive. The concept of operations permits the option of placing a second satellite using the orthogonal polarization at the same longitude, with the same frequency coverage, and the same geographical coverage to double the frequency reuse.

Figure 13:
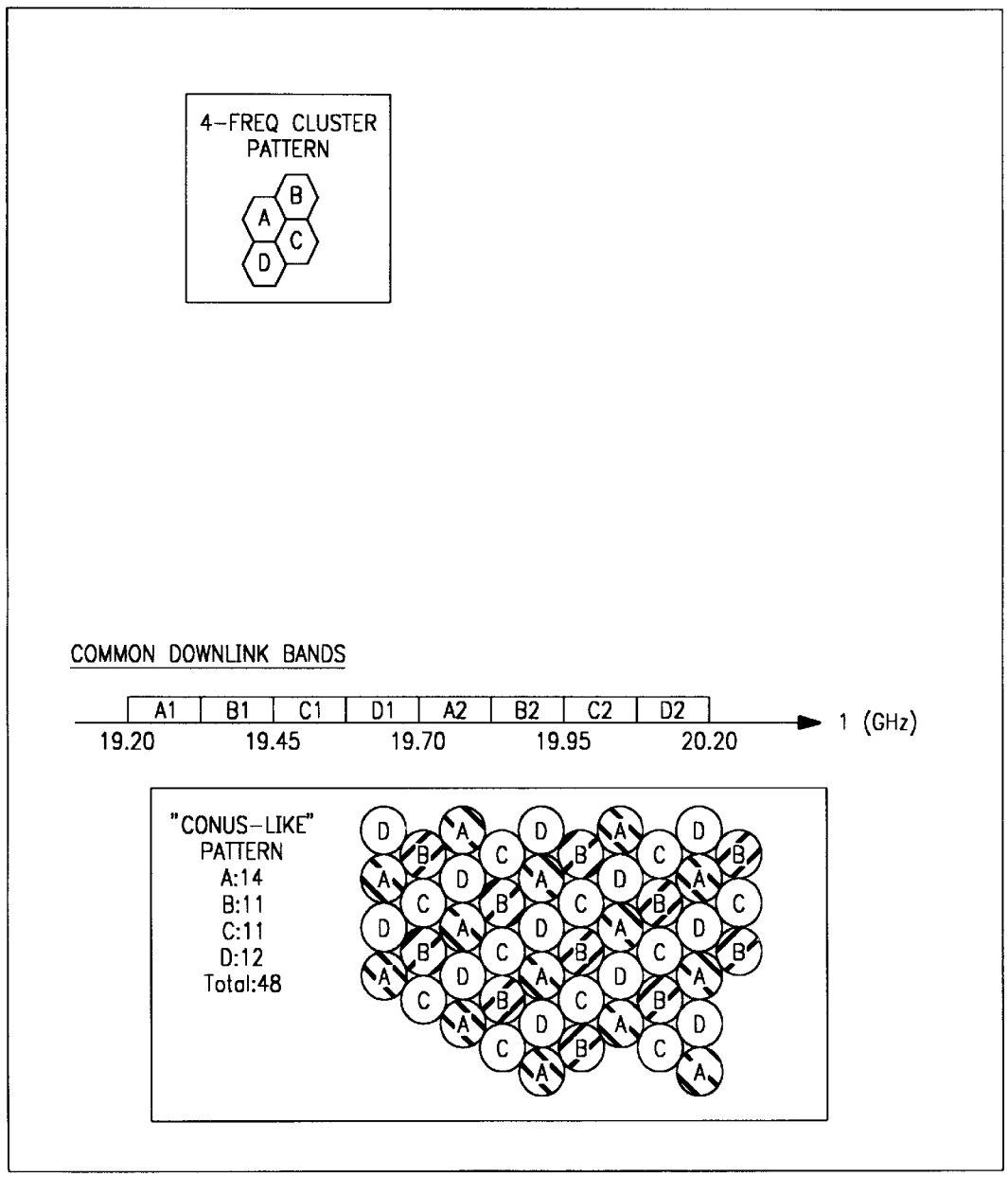
FIG. 13 illustrates exemplary multi-beam coverage patterns with donwnlink bands enabling frequency reuse in accordance with one form of the invention.

FIG. 13 shows how hexagonal beam tessellation using a cluster of four frequencies can be used to construct a 48-beam pattern. For symmetric overall patterns, all frequencies repeat equally, while for asymmetric patterns, there is an unequal distribution of the four frequencies which depends on the pattern's shape.

For a single satellite 100 with a symmetric coverage pattern (FIG. 13), each of the four pairs of uplink and downlink frequency bands is re-used 12 times in the 48-beam coverage area by spatial frequency re-use: that is, a total of 12.0 GHz of bandwidth is available at the satellite for both the uplink and the downlink. When a pair of satellites using circular polarization operates from the same geostationary orbital location into the same geographical area, polarization frequency reuse will double the re-use factor to 24.

Satellite 100 relies on a negligible probability of bit error subject to a discarded cell ratio of a few parts per million when a communication link is at the threshold of performance. This high integrity approach is realized by the use of powerful error control techniques.

A central consideration in the design of a Ka-band system is the need to provide a substantial link margin to accommodate the effects of rain, which become quite severe at these frequencies. This margin is attained in satellite 100 by applying a second level of error control. Since the additional margin is needed only part of the time, this second layer of coding is deployed adaptively, so that the additional bandwidth required to support it does not penalize UETs operating under clear sky conditions. Additional details about such adaptive coding is explained in U.S. application Ser. No. 09/163,775, filed Sep. 30, 1998 in the names of David A. Wright et al., entitled "Adaptive Coding Scheme For A Processing Communications Satellite", which is incorporated by reference and is assigned to the same assignee as the present application.

Each 212 byte (or octet) information block is adjoined with 24 bytes of parity to form a codeword in a (236,212) Reed-Solomon error correcting code. This code has the property that all patterns of 12 or fewer byte errors are correctable when the received version of the 236 bytes is subjected to decoding by a standard BCH decoding algorithm. As a side benefit, the decoding process almost always detects the presence of more than 12 errors with the result that such undecodable cases may be discarded rather than risk misdirection of the cells contained therein.

The design point for the outer code is based on a threshold byte error rate prior to decoding of 1.2%. For this input error rate, the probability that 12 or fewer errors are present in a block of 236 bytes may be shown to be about 7 parts per million, which is the threshold cell loss rate due to channel imperfections.

The link design calls for routine operation at one decibel above threshold, at which point the input error rate drops to about 0.24% and the concomitant probability of undecodability drops to less than 1 part per trillion. As noted above, the probability of decoding a block incorrectly is so small as to be negligible, even at threshold. The threshold described in the preceding paragraph typically occurs only under stressed conditions, such as heavy rain.

Inner coding is applied to the uplink and downlink for a UET 400 on an as-required basis. For lightly coded uplink traffic, no inner coding is applied. Lightly coded downlink traffic uses a rate 3/4 convolutional code. When required to mitigate unfavorable link conditions, a rate 1/2 inner code is used on the uplink and the downlink inner code is strengthened to rate 3/8. The reason for differing code rates is that, for a given rain rate, the amount of fading occurring in the 30 GHz uplink is greater than the degradation that occurs in the downlink. Note that the inner code is typically applied to both the uplink and the downlink traffic to and from a UET 400 concurrently and that the presence of severe fading is usually localized to a much smaller area than that covered by the satellite 100 beam.

The downlink inner code is a non-systematic, convolutional, rate 3/8 or 3/4 code for heavy and light, respectively, each with a constraint length of 7. This code is applied to three or six blocks (including the parity for the outer code) in each frame in the downlink after these blocks have been organized into a 236 by k*8 rectangular interleaving array where k=3 or 6 for heavy or light, respectively. The interleaver array is filled by rows (k*8 rows concurrently) with 236 byte blocks from the outer encoder. The array's contents are presented to the inner code encoder by columns from the array. After encoding, this expands to a total of 15,104 bits in a universal 64 by 236 data container plus 2 bytes used for tailing off the convolutional code. When decoded using the Viterbi Algorithm on soft decisions, this convolutional code produces output errors at an average bit error rate of 0.0015 (corresponding to a byte error rate of 1.2%) when the energy per component to noise ratio is at the threshold level.

A frame structure is imposed in both the uplink and the downlink for satellite 100. The downlink frame structure permits the separation of the heavily and the lightly coded traffic and forms part of the overall synchronization system that ensures the uplink bursts arrive at the satellite with a highly precise time placement. The uplink frame structure serves to define individual channel slots "chanslots" in each of the uplinking channels.

Figure 14:
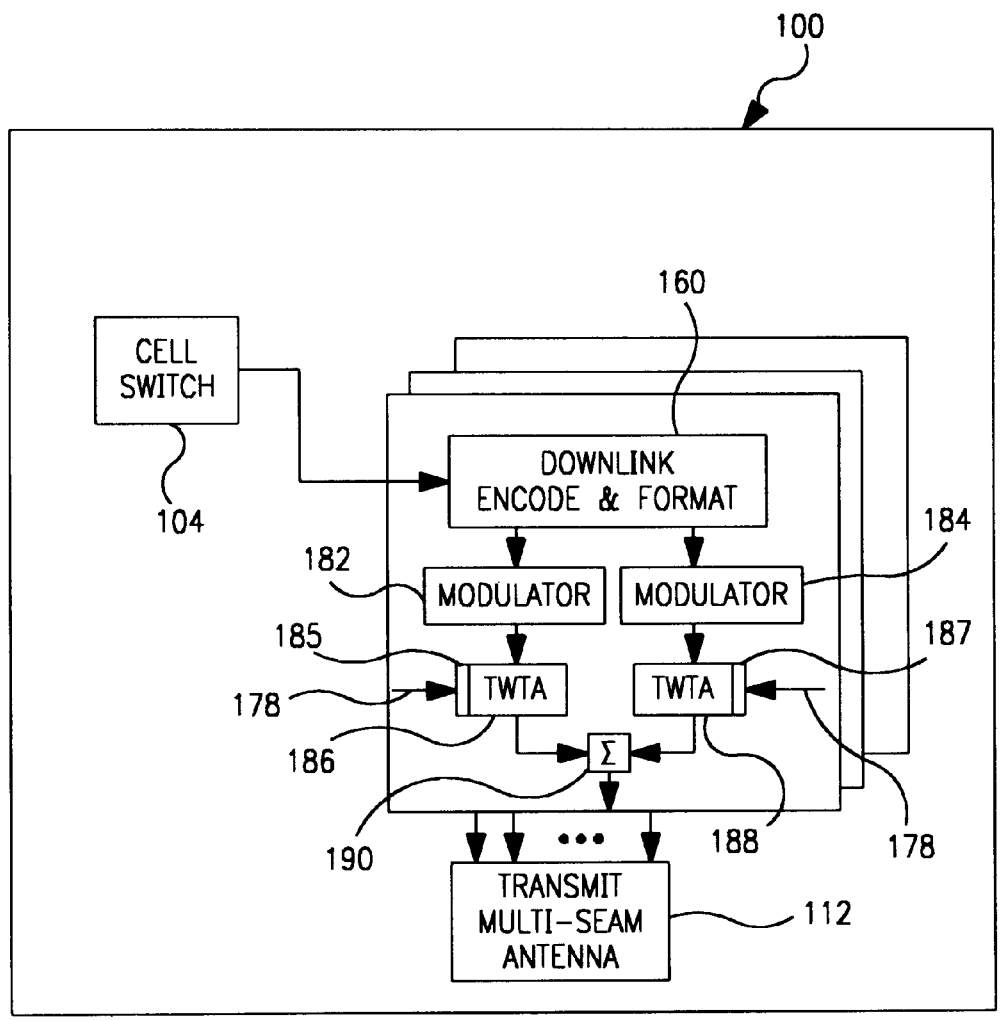
FIG. 14 is a schematic block diagram illustrating some of the satellite circuitry shown in FIG. 1.
Figure 15:
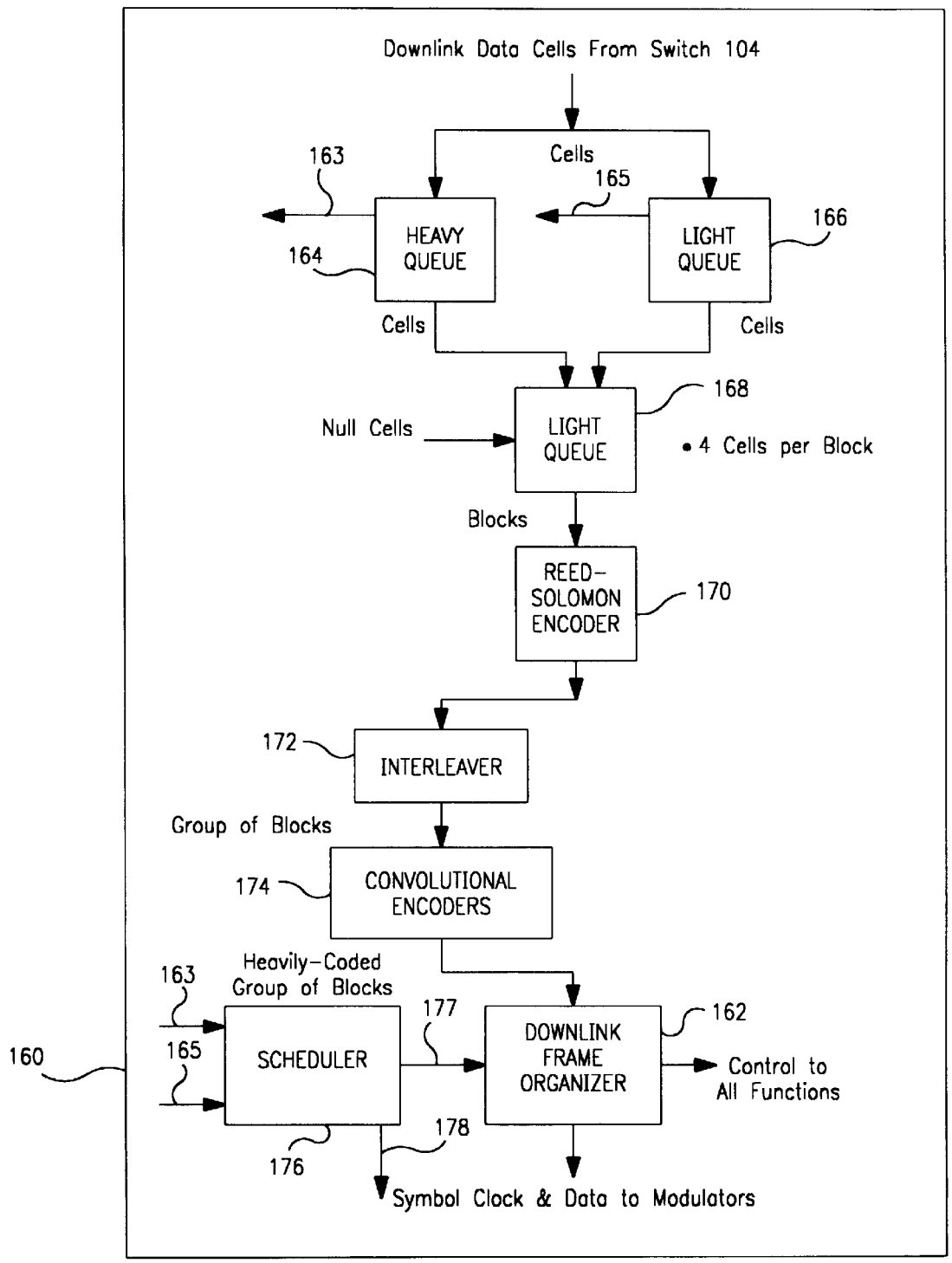
FIG. 15 is a schematic block diagram of the downlink encode and format circuitry shown in FIG. 14.

FIGS. 14 and 15 are block diagrams of the satellite 100 downlink transmission components. The downlink encode and format module 160 (FIG. 14) is shown in more detail in FIG. 15.

The master timing system at the satellite commands the formation of a downlink frame at intervals of 79.31 microseconds. When so commanded, the downlink frame organizer (DFO) 162 begins its task by determining whether heavily coded blocks of cells or lightly coded block of cells are to be placed into a frame or whether an empty (power gated) frame is to be formed. The determination is based on the signals received from a scheduler 176 over a bus 177. The scheduler determines the size of the queues in queue memories 164 and 166 based on the data received over buses 163 and 165. Scheduler 176 then generates a first frame type signal if heavily coded blocks are to be used, a second frame type signal if an empty frame is to be formed and a third frame type signal if lightly coded blocks are to be used. Scheduler 176 also generates a gating signal on a conductor 178 if the second frame type signal is generated indicating that an empty frame will be sent. The gating signal deactivates TWTAs 186 and 188 at the appropriate time when the frame body would be transmitted in order to reduce power consumption. The TWTAs include gates 185 and 187 (FIG. 14) which deactivate the TWTAs in response to the gating signal on conductor 178.

In response to the signals received from scheduler 176, DFO 162 first forms blocks, each of four cells, each cell of 53 bytes. The cells to fill these blocks are obtained from the output queue section of the satellite 100 fast cell switch 104 upon request by the DFO 162 (FIG. 15). If a heavy frame is being formed and the switch is unable to supply 12 cells from the heavy coded queue memory 164, then the DFO 162 requests cells from the lightly loaded queue memory 166 until the blocks for heavy coding are filled out. If all queues are exhausted, then the DFO 162 fills out the remaining blocks with null cells in a block former 168. If a light frame is being formed, then the DFO begins to fill out the blocks for the lightly coded downlink frame. If the supply of cells from the switch's light code queue is exhausted before the blocks are formed, then the remaining block content is filled out with null cells.

After the blocks required for the downlink frame are prepared, each block is used to generate a byte parity attachment to itself to form the coded block of a (236,212) Reed-Solomon code. This operation is performed by a Reed-Solomon encoder 170 (FIG. 15).

Blocks produced by the outer encoder are inserted by an interleaver 172 in a rectangular interleaving array as the next step in forming the downlink frame.

This array, read by columns, forms the input to two convolutional encoder 174 which expands the bits of the interleaver array to encoded bits (plus a tail off) which are organized as a linear string of dibits which will be presented to the downlink modulators 182 and 184 (FIG. 14).

After the outer and inner code actions have been completed, a string totaling 7552 symbols comprising the body of the downlink frame is ready for transmission. To this is prepended and prepended the other fields shown in FIG. 12. The total downlink frame is presented to the downlink modulator circuits 182 and 184 (FIG. 14) at a rate of 98.35 MHz (196.7 megachips/second) in an unbroken string from one downlink frame to the next.

The dibit stream produced by the DFO 162 is passed to the downlink modulators 182 and 184 as a continuous stream clocked at 98.35 MHz, i.e. the basic downlink rate. This stream is entered into a pair of transversal filters which produce two shaping functions consisting of a set of 393.4 MHz samples which define the envelope of spectrally compact shaped symbols formed by raised cosine 25% shaping of staggered QPSK. These samples are converted to the analog realm by means of a pair of high speed digital to analog devices. After passage through zonal filters, the resultant waveforms constitute the modulation waveforms for the I and Q components of the downlink. These waveforms are passed to a balanced mixer circuit which is also fed by the local oscillator for the downlink IF.

The resultant downlink IF is then upconverted to a specific band in the 20 GHz range using one of 8 different mixing frequencies, depending on which downlink band is being created, to form the drive signal for the high power amplifiers of satellite 100.

The satellite 100 may have two types of high power amplifiers (HPA), lower power or higher power traveling wave tube amplifiers (TWTA) 186 and 188 (FIG. 14). Generally, the smaller amplifier is intended to serve earth terminals for large volume users: such terminals may be expected to have much larger antennas than those for the low volume, lower availability users.

The drive signals to the HPAs are calibrated to place the operating point of the TWTAs at a level which optimizes the performance of the downlink, including the demodulator of UET 400.

The outputs of the HPAs are passed by waveguide to the downlink feed associated with the particular beam to which the signals are destined. This feed illuminates a parabolic antenna 112 which reflects the signal into a narrow beam (about 0.4 arcdegrees from midbeam to edge of coverage) resulting in an effective gain of about 48.0 dB (60,000 times) and an EIRP, for the band served by the higher power TWTA, of nearly 61 dBW (or 1.25 megawatts). As a result of the spectral shaping performed during the modulation process, the transmitted spectrum of each 98.35 megasymbol/second downlink band has good roll-off and is predominantly contained within the 125 MHz.

The circularly polarized signals of the two bands in the beam propagate downwards, subject to spreading loss, absorption and rain fading.

This section of the specification discusses the processing steps and the requisite equipment used by UET 400 to capture the downlink signal, demodulate it, recover the downlink frames, and decode, deinterleave and disassemble the blocks contained in the frame to extract the downlink cell flow. It also discusses how the transmission subsystem interacts with the UET's control subsystems to sieve the cells to determine which ones are relevant to the UET.

Downlink UET 400 transmission functions are performed partially outdoors and partially indoors. The indoor functions are predominately embodied in the Downlink Baseband Unit (DBU) 440 (FIG. 7) in the UET 400 (FIG. 1) which provides all baseband processing for the entire downlink regardless of the number of Uplink Baseband Units present in the UET 400.

Referring to FIGS. 1, 10, 7 and 16, the 20 GHz downlink signal for the UET's band is captured by the terminal's antenna 406 (FIG. 10). This antenna may be of any size, although 75 centimeters is a practical minimum. Generally, smaller size antennas will provide inadequate downlink rain margin and/or will have insufficient discrimination against signals from adjacent Ka-band satellite systems.

Although of modest physical dimensions, even the smallest antenna is optically fairly large, having a beam width of about 0.8 or 1.2 arcdegrees on the uplink or downlink, respectively. This implies that even the smallest antennas for the system must be mounted on a rugged mount and carefully aimed at the satellite 100. Larger antennas, above 1.5 meters, for example, may require an automatic pointing subsystem to avoid excessive gain loss due to satellite motion, wind deflection, et cetera.

Note that most terminals, such as UET 400, will utilize the same physical reflector for both reception and transmission. Such two-way antennas are fitted with a two-port feed, one port of which collects the downlink signal and passes it to the colocated low noise amplifier via a diplexor.

The downlink signal is amplified and downconverted to an intermediate frequency in a single stage low noise block down-converter (LNB) (not shown) located in the outdoor portion 432 of the user earth terminal (FIG. 7). The LNB uses high electron mobility transistors (HEMT) which provide high gain with little noise. The clear sky noise temperature of the terminal is approximately 180 kelvins including sky noise, antenna noise, and first amplifier noise. During stressed conditions of heavy precipitation, however, the effective system noise temperature can rise to nearly 500 kelvins as a result of excess sky noise induced by rain mass in the antenna's field of view.

The LNB has as an input a local oscillator signal at one of eight frequencies (switch selectable) to translate the UET's downlink band to a common intermediate frequency for transfer from the outdoor to the indoor portions of the UET 400 on the interconnecting coaxial cable after filtering to limit the transferred signal to the 125 MHz of the desired band.

Figure 16:
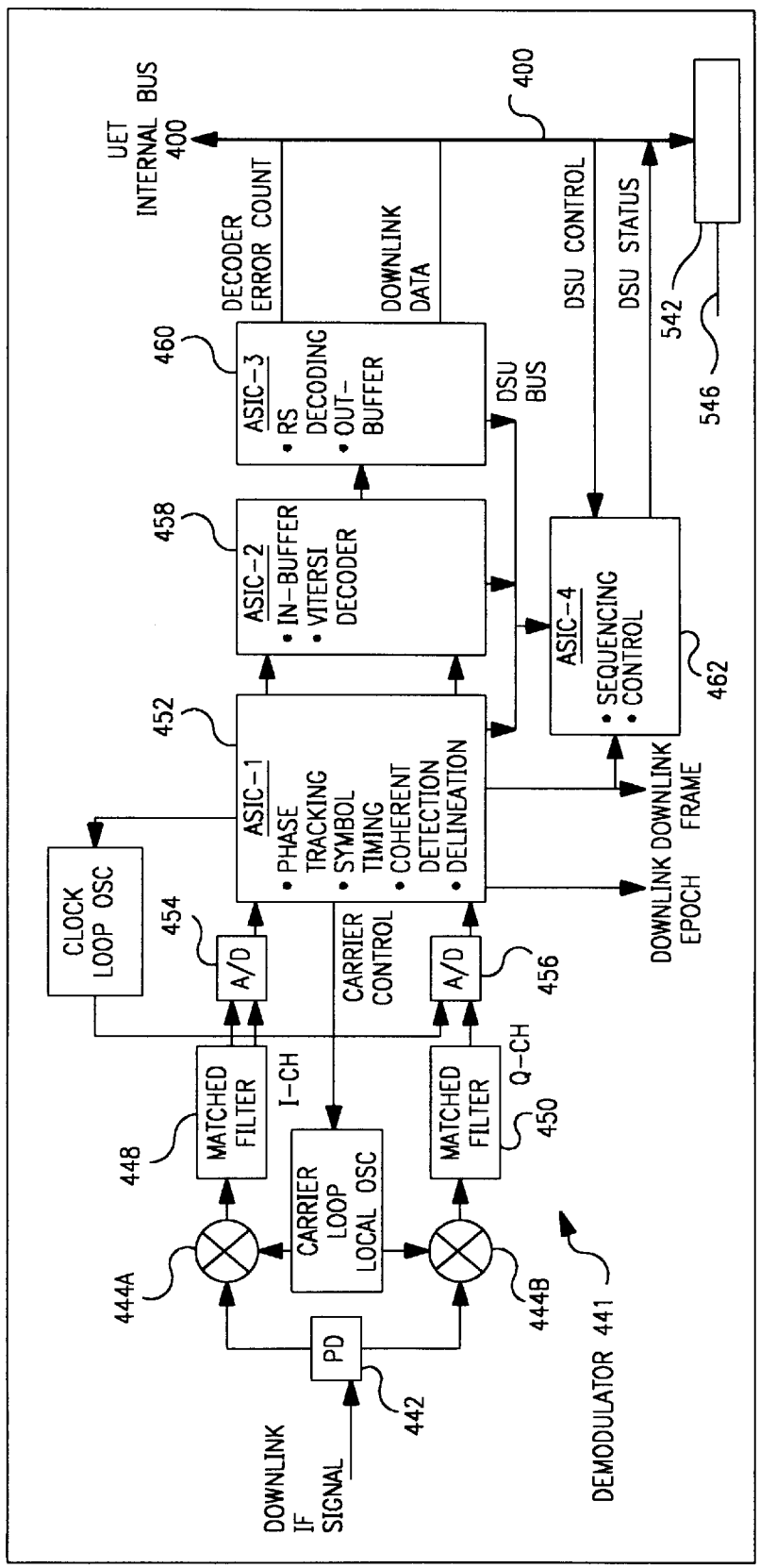
FIG. 16 is a schematic block diagram of a portion of the earth terminal circuitry shown in FIG. 1.

The downlink band signal is presented to a 98.35 megasymbol/sec. continuous demodulator 441 (FIG. 16). This equipment first separates the IF signal into I and Q baseband components by means of a power divider (PD) 442, balanced mixers 444A and 444B and a local oscillator signal generated by an oscillator 446. These two baseband signals are then passed through analog filters 448 and 450 approximately matched to the symbol shaping functions used at the satellite 100 and then each is sampled at a rate of 196.7 megasamples/second (two samples per symbol) and passed to a digital demodulator ASIC 452 through analog to digital converters 454 and 456.

ASIC 452 processes the baseband downlink to recover the data content of the waveforms. Functions embodied in the demodulator ASIC 452 include phase tracking, frequency difference estimation, symbol timing tracking, and coherent detection of the downlink data. The primary outputs of the ASIC 452 are soft decisions which are passed to a buffer for collection of a downlink frame which is to be disassembled. Also within the ASIC 452 is circuitry to detect the downlink synchronization sequence and to produce associated strobes which harmonize the entry of data into a buffer with the downlink frame structure.

An auxiliary function of ASIC 452 is to track the downlink symbol rate of 98.35 MHz and to provide feedback adjustment to a voltage controlled oscillator in the UET's master oscillator section to cause the UET's clock system to be tightly locked to that of the satellite's (as seen with Doppler shift).

Other functions of the demodulator ASIC 452 include providing a corrective signal to slew the LNB's down conversion to match the frequency of the downlink.

Upon reception of a strobe from the demodulator ASIC 452 reflecting the arrival of a complete downlink frame, the UET's inner code decoder 458 is set to work. This decoder 458 implements Viterbi's algorithm and is embodied in an ASIC which accepts soft decision inputs from the buffer, decodes based on these observables, and places the results in a de-interleaving array, writing by column.

After the deinterleaving array is filled, the contents are passed to the outer decoder 460. After the body of the frame has been inner code decoded, the blocks in the frame are presented one by one to the ASIC 460 which implements the Reed-Solomon decoding process for each of the blocks of received downlink data. The steps performed by the decoder are identical with those described for the satellite's uplink decoder described in the application entitled "Uplink Transmission and Reception Techniques for a Processing Communication Satellite", identified as U.S. patent application Ser. No. 09/408,331, filed in the names of Wright et al. on the same day as this application, and assigned to the same assignee as this application, and incorporated by reference into this application.

Blocks that complete the outer code decoding process satisfactorily are truncated to the original 212 information bytes by discarding the 24 byte parity field. As each block is decoded, it is resolved into four ATM cells of 53 bytes each.

Figure 17:
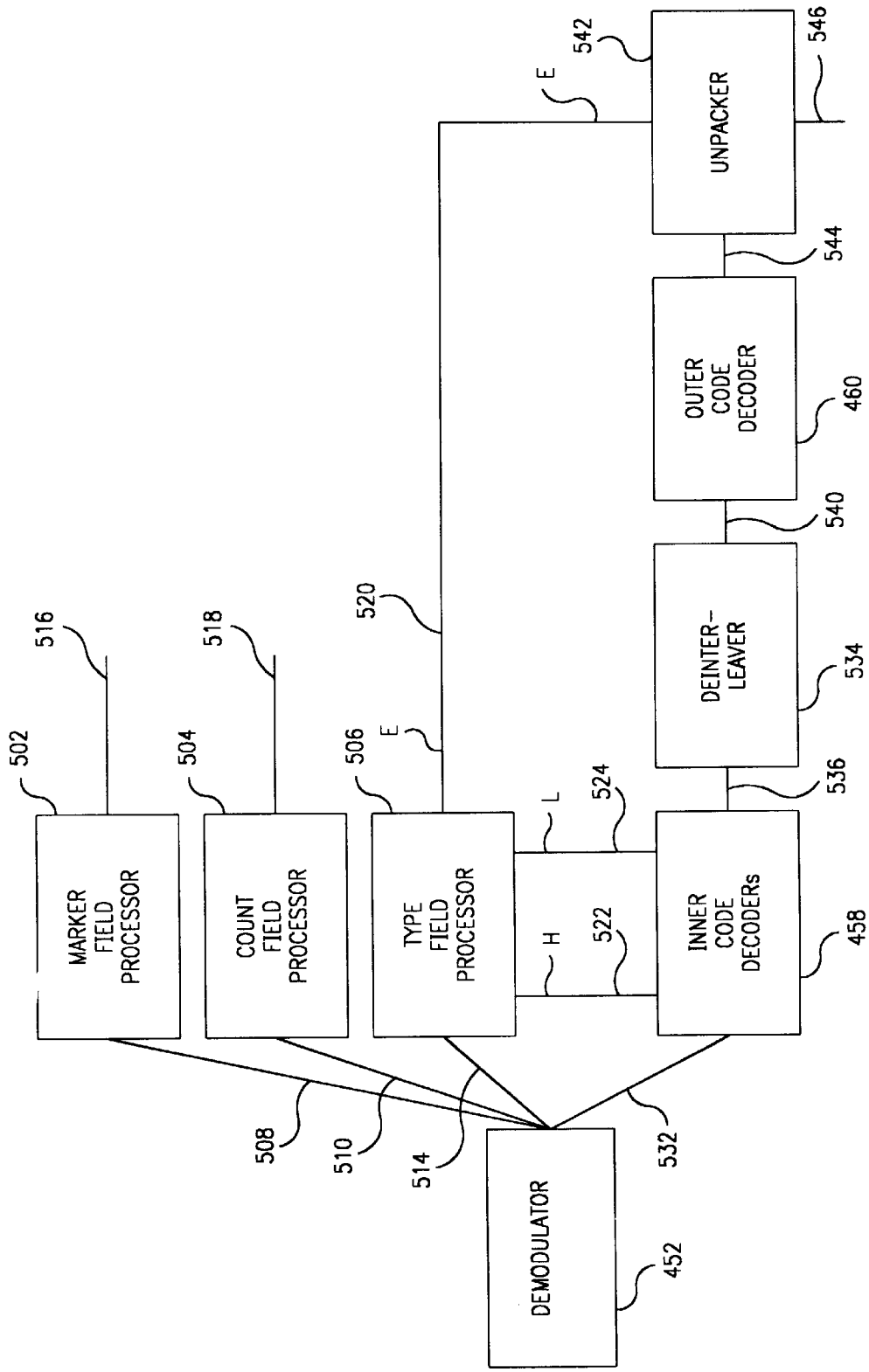
FIG. 17 is a schematic block diagram showing in more detail a portion of the circuitry illustrated in FIG. 16.

FIG. 17 illustrates additional circuitry which cooperates with the circuitry shown in FIG. 16. Demodulator 452 is connected to a marker field processor 502 over a bus 508; to a count field processor 504 over a bus 510 and to a type field processor 506 over a bus 514.

Marker field processor 502 generates output signals on a conductor 516 which indicate timing information obtained from the frame marker symbols shown in FIG. 12. The timing information is used to delineate data frames and to resolve modulation ambiguity.

Count field processor 504 generates output signals on a conductor 518 which indicate a non-repeating frame number of the frame most recently demodulated by demodulator 452. The frame number is obtained from the frame count symbols of the header shown in FIG. 12. The frame number does not repeat over the anticipated life of the satellite.

Type field processor 506 generates a signal on a conductor 520 indicating a substantially empty (E) data frame with a high percentage of null symbols; generates a signal on a conductor 522 indicating a heavily (H) coded data frame and generates a signal on a conductor 524 indicating a lightly (L) coded data frame. The signals on conductors 522 and 524 are conducted to inner code decoder 458 in order to facilitate the inner code decoding process.

Two inner code decoders 458 are connected to the output of demodulator 452 by a bus 532. A deinterleaver 534 is connected to the output of inner code decoder 458 by a bus 536. The output of the deinterleaver is connected to outer code decoder 460 over another bus 540. The deinterleaver deinterleaves the outer code blocks from the inner code blocks in a well known manner.

The output of decoder 460 is connected to an unpacker 542 over a bus 544. The unpacker uses the E signal on conductor 520 to prevent creating output cells from empty frames. Alternatively, decoders 458 and 460 will automatically reject blocks containing noise only so that no output is transmitted over bus 544.

As complete cells become available within the DBU 440 (FIG. 7), the cell header is isolated and the four byte portion containing the cell addressing is passed from the DBU 440 to the UET's terminal controller 412. Among the functions of controller 412 is sorting out which cells are relevant to the UET 400 (FIG. 1). For those cells which are relevant to the UET 400, the Terminal Controller 412 initiates commands to place the 53 byte cell on the UET's internal bus for transfer to itself and/or to one of the NIC's installed in the UET 400.

The operation of ASIC's 452, 458 and 460 is controlled by another ASIC 462 (FIG. 16). Additional details about synchronizing the operation of satellite 100, NOC 300 and UET 400 is described in "Synchronization Method For A Processing Communication Satellite," filed herewith in the names of David A. Wright, et al., and identified as U.S. patent application Ser. No. 09/408,965, which is incorporated by reference and which is assigned to the same assignee as the present application.

Additional details about the transmission gating of satellite 100 are described in U.S. application Ser. No. 09/270, 361, entitled "Gated Power Time Division Downlink For A Processing Satellite," filed Mar. 16, 1999 in the names of Stuart T. Linsky, et al., which is incorporated by reference and assigned to the same assignee as the present application.

The previously described uplink and downlink techniques are preferably coordinated as follows. As uplinked traffic bursts (e.g., TBn–TB52 (FIG. 4) are received by satellite 100, decoder 154 (FIG. 9) counts the number of errors discovered as each block is decoded. This count is compared by comparator 155 (FIG. 9) to a threshold count, and a one-bit high/low indicator is generated on output 156 for the channel and slot bearing the burst. A count is made for each such channel and slot in the uplink time frame. As previously explained, for channels of ZL frames there typically are 9100 slots per beam. For other types of frames, the number of slots per beam will vary. The set of high/low indicator bits for a frame is then packed into ATM traffic report cells (typically 25 cells in total) by cell former 157 (FIG. 9). By identifying a traffic report cell within a frame and the position within the cell at which a high/low bit appears, the corresponding channel/slot relevant to the high/low bit may be identified. In order to assist the identification process, cell former 157 maintains the high/low bits and traffic report cells in a precise order. Each traffic report cell is provided with an ATM address (VPI, VCI) and an identifier denoting it as a traffic report cell, and the cell is presented to the satellite's cell switch 104 (FIGS. 1 and 14). By using the address, the cell switch directs the report cell to the proper encoder and modulator which will place the report cell on a downlink beam directed to the proper location or ground terminal.

As uplink synchronization bursts (e.g., bursts SB1–SB26 (FIG. 4)) are received, they are processed by synch burst processor 143 (FIG. 9) at satellite 100 to measure the received energy and the time of arrival at the satellite in the manner previously described. From these measurements (transmitted on outputs 143A and 143B), a compact report (one nibble=four bits) is formed by cell former 144 (FIG. 9) for each of the synchronization burst slots. For ZL frames, there typically are 26 synchronization burst slots per frame, 25 frames per X channel and 7X channels for a total of 4550 slots per beam. For other types of frames, the number of slots per beam will vary as previously described. When the measurements for a frame have been completed, these nibbles are collected and packed into ATM synchronization report cells (typically 50 total) per frame. By identifying a synchronization report cell within a frame and the position within the cell at which a report nibble appears, the corresponding channel/slot and synchronization burst relevant to the report nibble may be identified. In order to assist the identification process, cell former 144 maintains the report nibbles and synchronization report cells in a precise order. Each synchronization report cell is provided with an ATM address (VPI, VCI) and an identifier denoting it as a synchronization report cell, and the cell is presented to the satellite's cell switch 104 which routes the cell to the correct downlink beam based on the ATM address as previously described.

As traffic bursts from the uplink complete the decoding process in decoders 152 and 154 (FIG. 9), the resultant decoded blocks are unpacked to recover the four constituent cells. Any null cells that are present (inserted to pad out every block to contain exactly four cells) are discarded at the satellite's receiver.

Non null cells from decoded blocks and report cells as described above are presented to the satellite's cell switch 104. Switch 104 permits cells arriving in any uplink beam to be coupled to any downlink beam for downward transmission to user terminals. This coupling is effected in accordance with the addressing (VIP, VCI) present in each ATM cell (including report cells as described above) and may involve replication of a cell to permit it to be inserted in several downlinks concurrently (multicasting).

Once transferred to the downlink side of satellite 100, any cell, including report cells, may be transmitted in the downlink to one or more user terminals in the beam using the method and means described previously. After propagating downwards to a user terminal (e.g., terminal 400 (FIG. 1)), the downlink signal is received and processed by the user terminal as previously described. The culmination of this processing is the decoding of the blocks contained in the downlink frame.

In addition to the processing described previously, the earth terminal 400 performs the following steps. As downlink bursts are received, the earth terminal unpacks the decoded blocks to obtain the ATM cells contained in the blocks. Any null cells extracted from the blocks are discarded. (Such cells are inserted to pad out each block in the frame to contain exactly four cells). All remaining cells are scrutinized (that is the VPI, VCI of the cell is examined) to determine if the cell is a member of a virtual circuit (VC) which is relevant to earth terminal 400. Non-relevant cells are discarded. Non-report cells are sent to user applications, et cetera, in the manner previously described. The report cells addressed to terminal 400 are further processed by earth terminal 400 to extract any portion relevant to the user terminal.

Synchronization report cells are processed to extract the nibble inserted at satellite 100 for the user terminal to indicate needed corrections in timing and/or power level. When these indicators have been extracted from the report cell by ASIC 460, the user terminal reacts by: (a) adjusting the timing of the uplink transmissions by a small increment (i.e., a small fraction of an uplink symbol epoch) and (b) adjusting the base gain of its transmitter's IF amplifier 417 by a small fraction to increase or decrease the level of all of its transmissions, including its synchronization bursts and all of its traffic bursts (if any traffic bursts are in progress). Referring to FIG. 7, the timing nibble is decoded and is transmitted over bus 437 to unit 416 (FIG. 7) which determines the launch instant for commencing the feed of a burst into modulator 420 (FIG. 2) for all channels based on the information in the timing nibble. The power nibble is decoded and transmitted on bus 437 to unit 416 in order to adjust the power level of IF amplifier 417 for all channels according to the information in the power nibble. If the energy of the synch bursts detected at satellite 100 decreases, the power level of IF amplifier 417 is increased by an increment.

Traffic report cells are processed by decoder 460 (FIG. 16) to extract the high/low bit(s) inserted at satellite 100 to indicate the error count seen at the satellite for an uplink channel and slot on its previous use by the user terminal. This error count indicator (i.e., high/low bit) is used by the earth terminal to recompute the transmitted power level to be used for the related channel and slot on subsequent transmissions. The high/low bit is transmitted over bus 437 (FIG. 7) to the power control algorithm within unit 400. As a result, the power level of IF amplifier 417 (FIG. 7) is adjusted for the particular channel and slot being transmitted by terminal 400. If errors occurred above the threshold count, the power level of IF amplifier 417 is increased by an increment. Another high/low bit may be used to adjust the power level of IF amplifier 417 to a different level for the transmission of the next slot. When the time next comes to launch an uplink burst for a particular channel and slot, the earth terminal 400 determines the appropriate power level (based on the reference level and channel/slot level as described above) and launches an uplink burst as previously described.

The time of arrival of the frame marker field (FIG. 12) at terminal 400 relative to the terminal's current timing (e.g., phase of downlink symbol clock 432) is determined and is used to retard or advance the frequency of the terminal's reference oscillator 431, the phase of uplink symbol clock 433 and the phase of downlink symbol clock 432. The time of arrival is used to generate a time signal on conductor 435 which adjusts reference oscillator 431 and clocks 432 and 433. The frequency of downlink symbol clock 432 closely tracks the downlink symbol frequency. The terminal's reference oscillator 431 is used in synthesizers to produce frequencies that, when multiplied upward by integers, are precise for usage in the uplink frequency channels as previously described.

Downlink symbol clock 432 (FIG. 7) is divided by an integer divider (175, 35, 7 respectively for type Z, Y, X transmissions) to produce a basic frequency for uplink symbol clock 433 (FIG. 7). The uplink symbol clock pulses are transmitted to base-band unit 416 over a conductor 436. The phase of uplink symbol clock 433 is varied as required (based on information regarding the satellite's current position received externally) to compensate for changes in the distance between terminal 400 and satellite 100 due to satellite motion. The details of the compensation are described in the application entitled "Synchronization Method For A Processing Communication Satellite," filed herewith in the names of David A. Wright, et al. which is incorporated by reference into this application and is assigned to the same assignee.

Those skilled in the art will recognize that the preferred form of the invention described above may be altered and modified without departing from the true spirit and scope of the invention as defined in the accompanying claims.

ADDENDUM

1. End-to-End Transmission Techniques for a Processing Satellite System

What is claimed is:

1. In a processing satellite communication system comprising an uplink for transmitting uplink data cells on an uplink beam from a ground terminal to said satellite and a downlink for transmitting downlink data cells on a downlink beam from the satellite to a ground terminal, apparatus for controlling the transmission of said uplink data cells comprising in combination:

an encoder arranged to group said uplink data cells with an error correction code and for locating said uplink data cells in predetermined uplink time slots within uplink frames comprising said uplink data cells;

a modulator connected to modulate said uplink frames by a predetermined form of modulation to enable placement of the modulated uplink frames into a plurality of uplink channels suitable for transmission to said satellite on said uplink beam, said uplink channels comprising a plurality of said uplink time slots;

an adjustable amplifier arranged to adjust the power level at which said uplink beam may be transmitted to said satellite;

a demodulator suitable for use in said satellite arranged to demodulate said channels into demodulated uplink frames;

a decoder arranged to decode said error correction code, to detect errors in said correction code and to make at least an error estimate of errors in said correction code;

a cell former arranged to form report cells comprising error information in response to said error estimate, addresses identifying destinations and identifiers indicating that said report cells contain said error information;

a frame organizer arranged to generate downlink frames comprising said report cells for transmission on said downlink beam; and a processor responsive to said downlink beam arranged to unpack said report cells from said downlink frames and to adjust said amplifier based on said error information in said report cells.

2. Apparatus, as claimed in claim 1, wherein said error estimate comprises an indication of a relationship between the number of errors in said error estimate and a threshold number of errors.

3. Apparatus, as claimed in claim 1, wherein said error information comprises a plurality of error bits, each error bit corresponding to one of said time slots of one of said channels.

4. Apparatus, as claimed in claim 3, wherein said report cells maintain said error bits in an order so that the time slots corresponding to said error bits can be determined.

5. Apparatus, as claimed in claim 1, wherein said report cells comprise ATM cells.

6. Apparatus, as claimed in claim 1, wherein said processor is capable of adjusting the amplifier separately for each of said time slots based on said error information.

7. Apparatus, as claimed in claim 6, wherein said error information comprises a plurality of error bits, each error bit corresponding to one of said time slots, and wherein said processor determines the time slot corresponding to said error bits in order to adjust said amplifier.

8. Apparatus, as claimed in claim 1, and further comprising a reference oscillator and wherein said uplink data cells comprise uplink symbols transmitted on said uplink beam at a first frequency, wherein said report cells comprise downlink symbols transmitted on said downlink beam at a second frequency, wherein said processor comprises a downlink symbol clock derived from said reference oscillator arranged to clock said downlink symbols at said second frequency, and wherein said modulator comprises an uplink symbol clock derived from said reference oscillator arranged to clock said uplink symbols at said first frequency which is an integer multiple of said second frequency.

9. Apparatus, as claimed in claim 8, wherein said downlink frames comprise frame markers and wherein the timing of said reference oscillator, said downlink symbol clock and said uplink symbol clock are varied depending on the times of arrival of said frame markers at said processor.

10. Apparatus, as claimed in claim 9, wherein the frequency of said reference oscillator and the phase of said downlink symbol clock and said uplink symbol clock are varied depending on the times of arrival of said frame marker at said processor.

11. Apparatus, as claimed in claim 1, wherein said encoder, modulator, amplifier and processor are located at one or more of said ground terminals and wherein said demodulator, decoder, cell former and frame organizer are located at said satellite.

12. Apparatus, as claimed in claim 1, wherein said apparatus further comprises a switch located in said satellite, wherein said downlink beam comprises a plurality of downlink beams, wherein said frame organizer comprises a plurality of frame organizers corresponding to said downlink beams, wherein said cell former is arranged to form downlink data cells in response to said uplink data cells, said downlink data cells comprising addresses identifying destinations, and is arranged to transmit said downlink data cells and said report cells to said switch, and wherein said switch directs said downlink data cells and said report cells to said frame organizers corresponding to said downlink beams based on said addresses, whereby said data cells arriving on said uplink beam can be directed to any of said downlink beams through the response of said switch to said addresses.

13. In a processing satellite communication system comprising an uplink for transmitting uplink data cells on an uplink beam from a ground terminal to said satellite and a downlink for transmitting downlink data cells on a downlink beam from the satellite to a ground terminal, a method of controlling the transmission of said uplink data cells comprising in combination:

grouping said uplink data cells with an error correction code;

locating said uplink data cells in predetermined uplink time slots within uplink frames comprising said uplink data cells;

modulating said uplink frames by a predetermined form of modulation to enable placement of the modulated uplink frames into a plurality of uplink channels suitable for transmission to said satellite on said uplink beam with an adjustable power level, said uplink channels comprising a plurality of said uplink time slots;

demodulating said channels into demodulated uplink frames;

decoding said error correction code, to detect errors in said correction code and to make at least an error estimate of errors in said correction code;

forming report cells comprising error information in response to said error estimate, addresses identifying destinations and identifiers indicating that said report cells contain said error information;

generating downlink frames comprising said report cells for transmission on said downlink beam;

unpacking said report cells from said downlink frames; and adjusting said power level based on said error information in said report cells.

14. A method, as claimed in claim 13, wherein said error estimate comprises an indication of a relationship between the number of errors in said error estimate and a threshold number of errors.

15. A method, as claimed in claim 13, wherein said error information comprises a plurality of error bits, each error bit corresponding to one of said time slots of one of said channels.

16. A method, as claimed in claim 13, wherein said report cells maintain said error bits in an order so that the time slots corresponding to said error bits can be determined.

17. A method, as claimed in claim 13, wherein said report cells comprise ATM cells.

18. A method, as claimed in claim 13, wherein said adjusting comprises adjusting said power level separately for each of said time slots based on said error information.

19. A method, as claimed in claim 18, wherein said error information comprises a plurality of error bits, each error bit corresponding to one of said time slots, and wherein said unpacking determines the time slot corresponding to said error bits in order to adjust said power level.

20. A method, as claimed in claim 13, wherein said uplink data cells comprise uplink symbols transmitted on said uplink beam at a first frequency, wherein said report cells comprise downlink symbols transmitted on said downlink beam at a second frequency, and further comprising generating reference clock pulses, generating downlink symbol clock pulses derived from said reference pulses, clocking said downlink symbols with said downlink symbol clock pulses at said second frequency, generating uplink symbol clock pulses derived from said reference oscillator arranged to clock said uplink symbols at said first frequency which is an integer multiple of said second frequency.

21. A method, as claimed in claim 20, wherein said downlink frames comprise frame markers and wherein the timing of said reference pulses, said downlink symbol clock pulses and said uplink symbol clock pulses are varied depending on the times of arrival of said frame markers at said ground terminal.

22. A method, as claimed in claim 21, wherein the frequency of said reference pulses and the phase of said downlink symbol clock pulses and said uplink symbol clock pulses are varied depending on the times of arrival of said frame marker at said ground terminal.

23. A method, as claimed in claim 13, wherein said grouping, locating, modulating, unpacking and adjusting occur at one or more of said ground terminals and wherein said demodulating, decoding, forming and generating occur at said satellite.

24. A method, as claimed in claim 13, wherein said downlink beam comprises a plurality of downlink beams, wherein said forming report cells further comprises forming downlink data cells comprising addresses identifying destinations in response to said uplink data cells, wherein said generating downlink frames comprises generating downlink frames comprising said downlink data cells and report cells for transmission by one of said downlink beams based on said addresses, whereby said data cells arriving on said uplink beam can be directed to any of said downlink beams through the use of said addresses.

25. In a processing satellite communication system comprising an uplink for transmitting uplink data cells on an uplink beam from a ground terminal to said satellite and a downlink for transmitting downlink data cells on a downlink beam from the satellite to a ground terminal, apparatus for controlling the transmission of said uplink data cells data comprising in combination:

an uplink frame organizer arranged to locate burst signals in predetermined time slots within uplink frames comprising said uplink data cells;

an uplink unit arranged to launch said uplink frames at a predetermined adjustable time so as to place the uplink frames into a plurality of uplink channels suitable for transmission to said satellite on said uplink beam, said uplink channels comprising a plurality of said time slots;

an adjustable amplifier arranged to adjust the power level at which said uplink beam may be transmitted to said satellite;

a demodulator suitable for use in said satellite arranged to demodulate said channels into demodulated uplink frames;

an uplink processor responsive to said uplink beam arranged to make at least an estimate of the received energy of said burst signals or the time of arrival of said burst signals at said satellite;

a cell former arranged to form report cells comprising report information in response to said estimate of the received energy of said burst signal or the time of arrival of said burst signal at said satellite, addresses identifying destinations and identifiers indicating that said report cells contain said report information;

a downlink frame organizer arranged to generate downlink frames comprising said report cells for transmission on said downlink beam; and a downlink processor responsive to said downlink beam arranged to unpack said report cells from said downlink frames, to adjust said amplifier based on said report information in said report cells in response to said estimate of the received energy of said burst signal or to adjust said adjustable time based on said report information in said report cells in response to said the time of arrival of said burst signals at said satellite.

26. Apparatus, as claimed in claim 25, wherein said downlink processor adjusts said amplifier for all said uplink channels.

27. Apparatus, as claimed in claim 25, wherein said downlink processor adjusts said adjustable time for all said uplink channels.

28. Apparatus, as claimed in claim 25, wherein said cell former forms report cells including report information in response to said estimate of the received energy of said burst signal and the time of arrival of said burst signal at said satellite, and wherein said downlink processor adjusts said amplifier based on said report information in said report cells in response to said estimate of the received energy of said burst signal and adjusts said adjustable time based on said report information in said report cells in response to said the time of arrival of said burst signals at said satellite.

29. Apparatus, as claimed in claim 25, wherein said error information comprises groups of bits, each group of bits corresponding to one of said time slots.

30. Apparatus, as claimed in claim 29, wherein said report cells maintain said groups of bits in an order so that the time slots corresponding to said groups of bits can be determined.

31. Apparatus, as claimed in claim 25, wherein said report cells comprise ATM cells.

32. Apparatus, as claimed in claim 25, wherein said uplink frame organizer, uplink unit, amplifier and downlink processor are located at one or more of said ground terminals and wherein said demodulator, uplink processor, cell former and downlink frame organizer are located at said satellite.

33. In a processing satellite communication system comprising an uplink for transmitting uplink data cells on an uplink beam from a ground terminal to said satellite and a downlink for transmitting downlink data cells on a downlink beam from the satellite to a ground terminal, a method of controlling the transmission of said uplink data cells data comprising in combination:

locating burst signals in predetermined time slots within uplink frames comprising said uplink data cells;

launching said uplink frames at a predetermined adjustable time so as to place the uplink frames into a plurality of uplink channels suitable for transmission to said satellite on said uplink beam at an adjustable power level, said uplink channels comprising a plurality of said time slots;

demodulating said channels into demodulated uplink frames;

making at least an estimate of the received energy of said burst signals or the time of arrival of said burst signals at said satellite;

forming report cells comprising report information in response to said estimate of the received energy of said burst signal or the time of arrival of said burst signal at said satellite, addresses identifying destinations and identifiers indicating that said report cells contain said report information;

generating downlink frames comprising said report cells for transmission on said downlink beam; and unpacking said report cells from said downlink frames; and adjusting said power level based on said report information in said report cells in response to said estimate of the received energy of said burst signal or said adjustable time based on said report information in said report cells in response to said the time of arrival of said burst signals at said satellite.

34. A method, as claimed in claim 33, wherein said adjusting said power level comprises adjusting said power level for all said uplink channels.

35. A method, as claimed in claim 33, wherein said adjusting said adjustable time comprises adjusting said adjustable time for all said uplink channels.

36. A method, as claimed in claim 33, wherein said forming forms report cells including report information in response to said estimate of the received energy of said burst signal and the time of arrival of said burst signal at said satellite, and wherein said adjusting said power level is based on said report information in said report cells in response to said estimate of the received energy of said burst signal and said adjusting said adjustable time is based on said report information in said report cells in response to said the time of arrival of said burst signals at said satellite.

37. A method, as claimed in claim 33, wherein said error information comprises groups of bits, each group of bits corresponding to one of said time slots.

38. A method, as claimed in claim 37, wherein said report cells maintain said groups of bits in an order so that the time slots corresponding to said groups of bits can be determined.

39. A method, as claimed in claim 33, wherein said report cells comprise ATM cells.

40. A method, as claimed in claim 33, wherein said locating, launching, unpacking and adjusting occur at one or more of said ground terminals and wherein said demodulating, making, forming and generating occur at said satellite.

* * * * *